United States Patent
Wittenberg et al.

(10) Patent No.: US 8,842,215 B2
(45) Date of Patent: Sep. 23, 2014

(54) ELECTRONIC DEVICE WITH SHAPE MEMORY DEVICES

(75) Inventors: Michael B. Wittenberg, Sunnyvale, CA (US); Daniel W. Jarvis, Sunnyvale, CA (US); Ashutosh Y. Shukla, Santa Clara, CA (US); Shayan Malek, San Jose, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 13/420,244

(22) Filed: Mar. 14, 2012

(65) Prior Publication Data

US 2013/0242150 A1   Sep. 19, 2013

(51) Int. Cl.
*H04N 5/232* (2006.01)
*G03B 13/00* (2006.01)
*H04N 5/235* (2006.01)
*G03B 7/00* (2014.01)
*G03B 9/08* (2006.01)

(52) U.S. Cl.
USPC .......................... 348/357; 348/362; 396/452

(58) Field of Classification Search
USPC ............ 348/357, 362–363, 367; 396/97, 452; 310/307
See application file for complete search history.

(56) References Cited

U.S. PATENT DOCUMENTS

| | | | |
|---|---|---|---|
| 6,554,501 B2 | 4/2003 | Kosaka et al. | |
| 7,976,230 B2 | 7/2011 | Ryynanen et al. | |
| 8,174,608 B2 * | 5/2012 | Hara et al. | 348/357 |
| 2006/0064055 A1 * | 3/2006 | Pile-Spellman et al. | 604/95.05 |
| 2006/0272328 A1 * | 12/2006 | Hara et al. | 60/527 |
| 2007/0109412 A1 * | 5/2007 | Hara | 348/207.1 |
| 2008/0278590 A1 | 11/2008 | Tanimura et al. | |
| 2009/0009656 A1 * | 1/2009 | Honda et al. | 348/372 |
| 2010/0060776 A1 * | 3/2010 | Topliss et al. | 348/340 |
| 2010/0196001 A1 * | 8/2010 | Ryynanen et al. | 396/493 |
| 2010/0283887 A1 * | 11/2010 | Topliss et al. | 348/345 |
| 2011/0249131 A1 * | 10/2011 | Topliss et al. | 348/208.7 |
| 2011/0314742 A1 * | 12/2011 | Hsu | 49/358 |
| 2012/0019675 A1 * | 1/2012 | Brown | 348/208.2 |
| 2012/0206615 A1 * | 8/2012 | Tanimura et al. | 348/208.99 |

* cited by examiner

*Primary Examiner* — Kelly L Jerabek
(74) *Attorney, Agent, or Firm* — Treyz Law Group; G. Victor Treyz; Kendall P. Woodruff

(57) ABSTRACT

An electronic device may be provided with shape memory structures. The shape memory structures may be used to form actuators for a camera shutter, an actuator for moving an optical filter, or other actuators in an electronic device. A camera shutter may have an opaque shutter member that is movable between a first position in which the shutter is closed and blocks light from a digital image sensor and a second position in which the shutter is open and allows light to reach the digital image sensor. The camera shutter may have an associated color filter structure. Shape memory wire may be configured to form a loop that heats upon application of a signal or may be configured to form a twisting or linear actuator. The camera shutter may be provided with a controllable aperture.

20 Claims, 25 Drawing Sheets

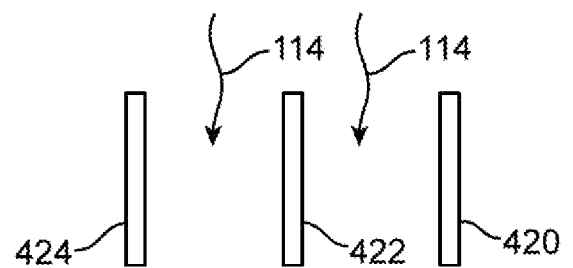
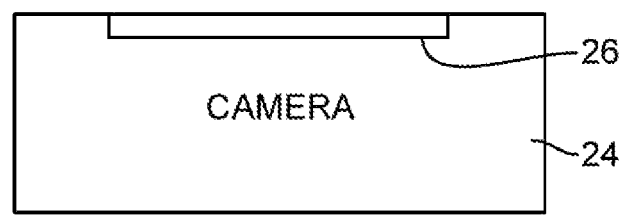
FIG. 30
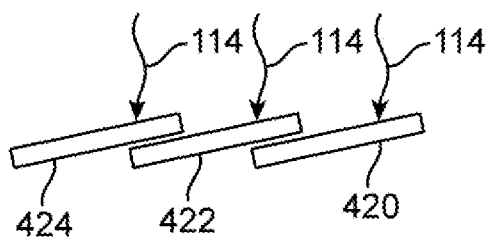
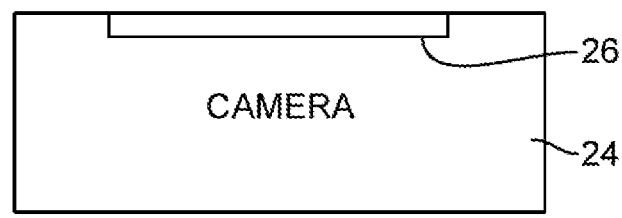
FIG. 31

ABSTRACT
ELECTRONIC DEVICE WITH SHAPE MEMORY DEVICES

BACKGROUND

This relates generally to electronic devices, and more particularly, to components with moving parts such as camera shutters in electronic devices.

Electronic devices such as portable computers and cellular telephones are often provided with digital image sensors. It may desirable to provide a digital image sensor with a mechanical shutter. For example, a mechanical shutter may be used to combat undesired electronic rolling shutter artifacts in a digital image sensor.

If care is not taken, however, a mechanical shutter may add undesired size and weight to an electronic device. Particularly in compact devices such as cellular telephones, tablet computers, portable computers, and other such electronic devices, it may not be acceptable to use bulky conventional mechanical camera shutters.

It would therefore be desirable to be able to provide improved ways of forming mechanical devices such as shutters for image sensors in electronic devices.

SUMMARY

An electronic device may be provided with shape memory structures. Upon heating, the shape memory structures may transition from a lower-temperature shape to a higher temperature shape. Shape memory structures may be provided with segments of different dimensions so that different portions of the structures exhibit shape transitions at different times.

The shape memory structures may be used to form an actuator for a camera shutter, an actuator for moving an optical filter, or other actuators in an electronic device. A camera shutter may have an opaque shutter member that is movable between a first position in which the shutter is closed and blocks light from a digital image sensor and a second position in which the shutter is open and allows light to reach the digital image sensor. The camera shutter may have an associated color filter structure. Shape memory wire may be configured to form a loop that heats upon application of a signal or may be configured to form a twisting or linear actuator. The camera shutter may be provided with a controllable aperture.

Further features of the invention, its nature and various advantages will be more apparent from the accompanying drawings and the following detailed description of the preferred embodiments.

BRIEF DESCRIPTION OF THE DRAWINGS

FIG. 30 is a side view of the illustrative shape memory shutter of FIG. 29 in which the shutter members have been twisted to open the shutter in accordance with an embodiment of the present invention.

FIG. 31 is a side view of the illustrative shape memory shutter of FIG. 29 in which the shutter members have been twisted to close the shutter in accordance with an embodiment of the present invention.

DETAILED DESCRIPTION

Figure 1:
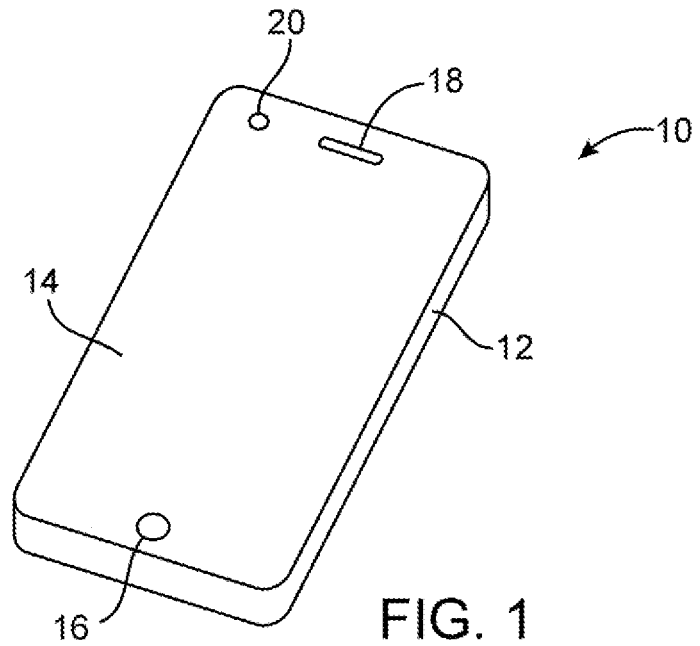
FIG. 1 is a front perspective view of an illustrative electronic device of the type that may include a digital image sensor and a shutter in accordance with an embodiment of the present invention.

Electronic devices such as electronic device 10 of FIG. 1 may be provided with camera systems. Digital images may be captured using an image sensor. A shutter may be used to selectively block image light or allow image light to reach the image sensor. There may be any suitable number of image sensors and shutters in device 10. For example, there may be one image sensor and one corresponding shutter in device 10, there may be two images sensors and two respective shutters in device 10, or there may be three or more image sensors and shutters in device 10 (as examples).

Shutters and other mechanical devices with moving parts may be formed using shape memory material. Control circuitry in device 10 may apply control signals to the shape memory material. As an example, a shutter may have a loop of shape memory wire. A control circuit in device 10 may apply current to the loop of shape memory wire when it is desired to actuate the shutter.

Device 10 of FIG. 1 may be a computer monitor with an integrated computer, a desktop computer, a television, a notebook computer, other portable electronic equipment such as a cellular telephone, a tablet computer, a media player, a wristwatch device, a pendant device, an earpiece device, other compact portable devices, or other electronic equipment.

Device 10 of FIG. 1 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. Housing 12 may be formed from a unibody structure (e.g., a structure that is machined from a single piece of material) or may include internal frame structures and exterior wall structures (as examples). Other types of housing construction may also be used if desired.

Device 10 may, if desired, have a display such as display 14. Display 14 may be a touch screen that incorporates capacitive touch electrodes or display 14 may be touch insensitive. Display 14 may include image pixels formed from light-emitting diodes (LEDs), organic LEDs (OLEDs), plasma cells, electrophoretic display elements, electrowetting display elements, liquid crystal display (LCD) components, or other suitable image pixel structures. A cover layer such as a layer of glass or clear plastic may cover the surface of display 14. Buttons and speaker port openings may pass through openings in the cover glass. For example, the cover layer for display 14 may have an opening for a front-facing button such as button 16 and a speaker opening such as speaker port opening 18.

Portions of display 14 may form active regions (i.e., regions in which the image pixels of display 14 form images for a user). Portions of display 14 may also form inactive regions (e.g., peripheral portions of display 14 that to not have any active image pixels). Camera window structures such as camera window structure 20 may be provided in the cover layer for display 14 (e.g., to form a front-facing camera). Camera window 20 of FIG. 1 may, for example, be formed in an inactive portion of display 14. The display cover layer in the inactive portion of display 14 may be provided with an opaque masking layer such as a layer of black ink. Camera window 20 may be formed from an opening in the opaque masking layer.

Figure 2:
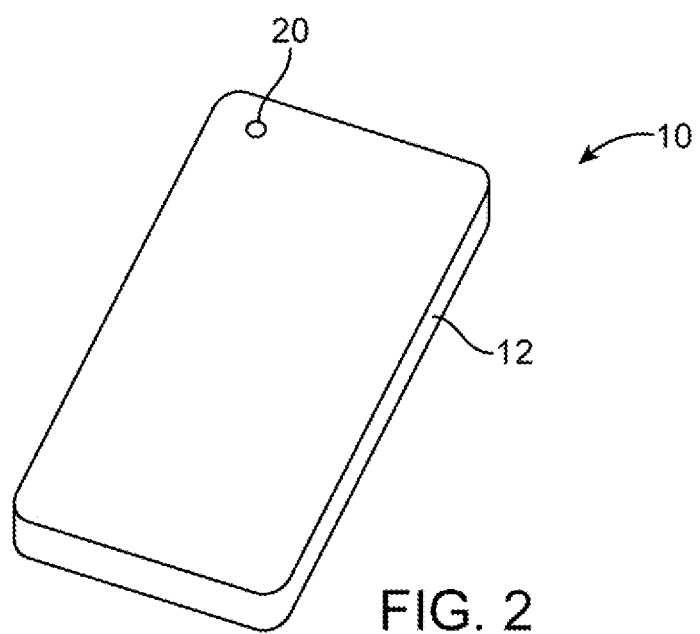
FIG. 2 is a rear perspective view of an illustrative electronic device of the type that may include a digital image sensor and a shutter in accordance with an embodiment of the present invention.

If desired, camera windows 20 may be formed elsewhere in device housing 12. As shown in the rear perspective view of device 10 of FIG. 2, camera window 20 may be formed on the rear surface of housing 12 (e.g., to form a rear-facing camera).

Figure 3:
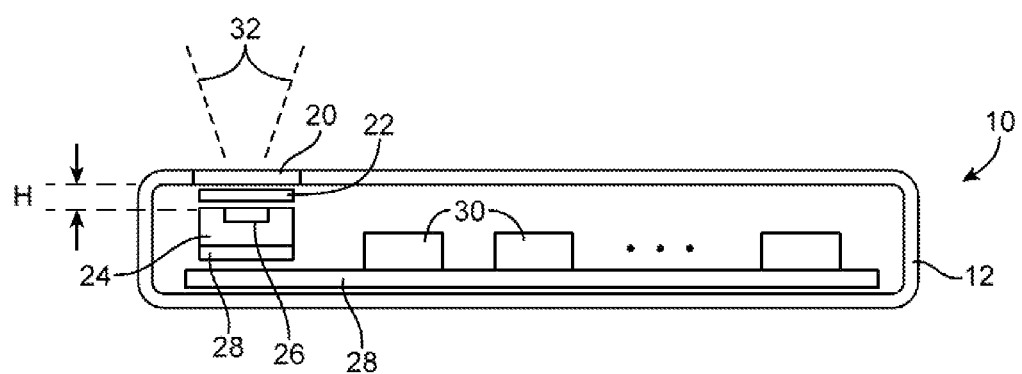
FIG. 3 is a cross-sectional side view of an electronic device containing a digital image sensor with a mechanical shutter in accordance with the present invention.

FIG. 3 is a cross-sectional side view of electronic device 10. As shown in FIG. 3, camera 24 may include one or more lens structures such as lens 26. Image light 32 may pass through transparent camera window 20 in housing 12 (e.g., the display cover layer, a rear housing surface, or other portions of device 10). The received image light may be focused by lens 26 onto digital image sensor 28 in camera 24. Digital image sensor 28 may be a complementary metal-oxide-semiconductor (CMOS) sensor, a charge-coupled device (CCD) sensor, or other suitable image sensor capable of capturing digital images for device 10.

Device 10 may include control circuitry such as one or more microprocessors, digital signal processors, system-on-chip circuits, microcontrollers, application-specific integrated circuits, memory chips, solid state drives, removable memory devices, volatile memory circuits, non-volatile memory circuits, hard disk drives, etc. As shown in FIG. 3, control circuitry may be implemented using one or more electrical components 30 mounted to one or more substrates such as substrate 28. Components 30 may include integrated circuits, discrete components, sensors, connectors, battery structures, status indicator lights (e.g., light-emitting diodes), displays, input-output components, wired and wireless communications circuitry, etc. Substrate 28 may be a rigid printed circuit board (e.g., a fiberglass-filled epoxy board), a flexible printed circuit (e.g., a "flex circuit" formed from conductive traces on a flexible sheet of polymer such as polyimide), other dielectric structures, or other suitable substrate materials.

Space may be at a premium in compact devices, so it may be desirable to form shutter 22 using a compact shutter structure. As shown in FIG. 3, for example, the vertical separation H between the inner surface of camera window 20 and housing 12 and the exterior surface of camera 24 and lens 26 may be relatively small (e.g., less than 4 mm, less than 3 mm, less than 2 mm, less than 1 mm, less than 0.5 mm, less than 0.25 mm, less than 0.1 mm, or other suitable size). The relatively small size of separation H between camera 24 and camera window 20 may make it impractical to accommodate conventional bulky camera shutter mechanisms into device 10.

Accordingly, device 10 preferably uses a shutter configuration for shutter 22 that allows shutter 22 to be formed in a compact size (if desired). In particular, shutter 22 may be formed using an actuator system that is based on shape memory material. The shape memory material may be heated by passing a current through the shape memory material or using a separate heating element. Using shape memory effects (e.g., the two-way shape memory effect), the state of shutter 22 may be controlled. When the shape memory material is maintained at room temperature, the shape memory material may have a first shape that places the shutter in a corresponding first state. When the shape memory material is heated to an elevated temperature (e.g., a temperature above room temperature), the shape memory material may have a second shape that places the shutter in a corresponding second state.

The shape memory material may be based on any suitable shape memory substance (e.g., nitinol or other shape memory metal alloys, shape memory polymers, etc.). Shape memory material for shutter 22 may be formed into wires, strips of material, or other suitable structures.

Figure 4:
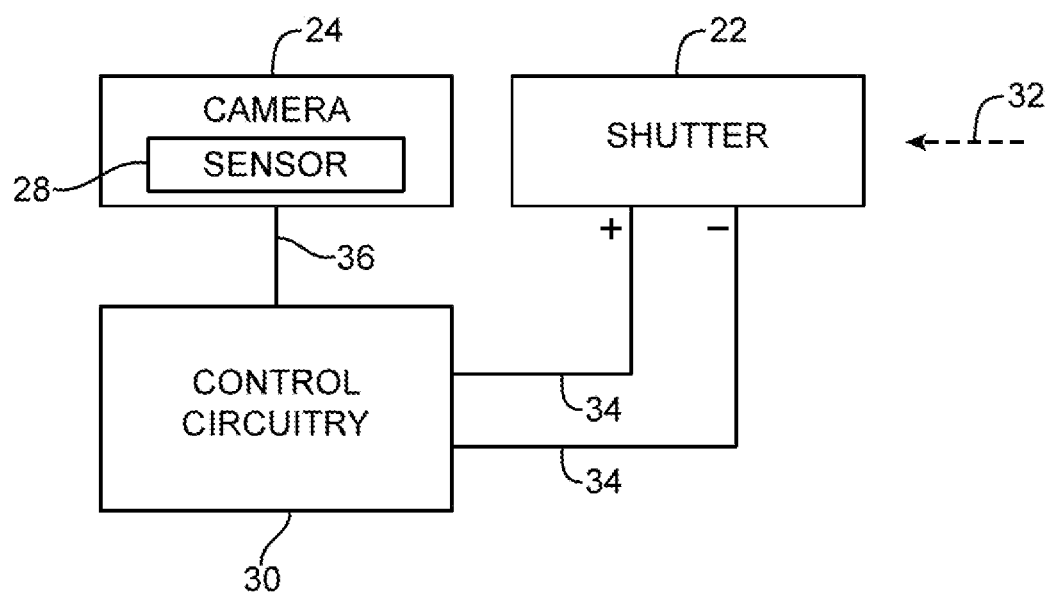
FIG. 4 is a diagram of a camera system with a shutter in accordance with an embodiment of the present invention.

A diagram showing how control circuitry 30 of device 10 may be used in controlling camera 24 and shutter 22. As shown in FIG. 4, control circuitry 30 may be coupled to camera 24 (i.e., digital image sensor 28) using path 36. Control circuitry 30 may use path 36 to supply signals to sensor 28 such as power and control signals. Control circuitry 30 may use path 36 to receive digital image data from sensor 28 during camera operation.

Shutter 22 may be placed in an open position to allow image light 32 to reach sensor 28 or may be placed in a closed position to prevent image light 32 from reaching sensor 28. Control circuitry 30 may use a control path such as a control path formed from control lines 34 to supply control signals to shutter 22 to control the movement of shutter 22. Lines 34 may include a first line coupled to a first shutter terminal (+) and a second line coupled to a second shutter terminal (−) that receive a signal (e.g., a current) from control circuitry 30. The current may pass through the shape memory material in shutter 22. As the current passes through the shape memory material, the shape memory material may become heated due to Ohmic heating, thereby causing shape memory actuator structures in shutter 22 to actuate shutter 22.

Figure 5:
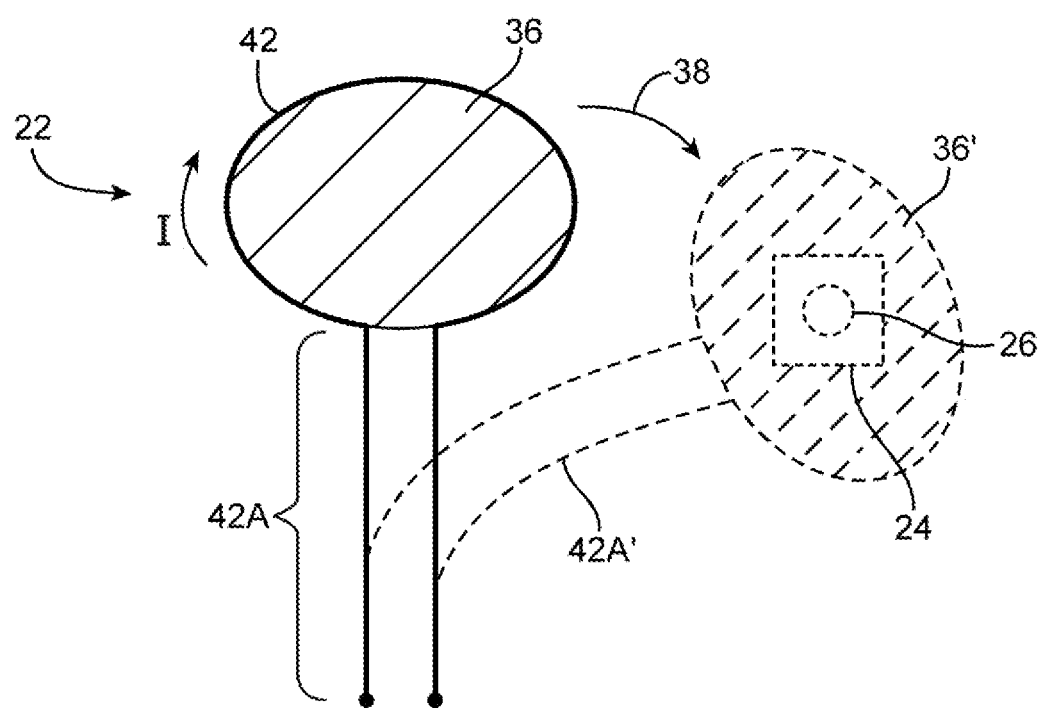
FIG. 5 is a top view of an illustrative shutter formed from shape memory material in accordance with an embodiment of the present invention.

An illustrative shape memory shutter is shown in FIG. 5. Shutter 22 of FIG. 5 may have a shutter member such as shutter member 36. Shutter member 36 may be formed from a material that blocks light 32 (FIGS. 3 and 4). Shape memory material may be provided in the form of looped wire 42 (as an example). Looped wire 42 may have a portion that supports shutter member 36. Looped wire 42 may also have a portion that forms an actuator for shutter 22. In the FIG. 5 example, looped wire 42 has protruding arms 42A. Terminals (+) and (−) may be formed at the ends of arms 42A. Terminals (+) and (−) of the shape memory actuator structure of shutter 22 of FIG. 5 (and the other illustrative shutter structures described herein) may be coupled respectively to the (+) and (−) lines in path 34 of FIG. 4.

When it is desired to actuate the actuator for shutter 22, a signal (voltage/current) may be supplied across terminals (+) and (−), thereby causing a current I to flow through looped wire 42. The current flow may Ohmically heat arm portions 42A of wire 42. When heated, arms 42A may change from their low-temperature shape (shown by arms 42A in FIG. 5) to their high-temperature shape (shown by deformed arms 42A' of FIG. 5). As indicated by arrow 38, this causes shutter member 36 to move to position 36', thereby covering camera 24 and lens 26 and (FIG. 3). When the current to wire 42 is interrupted by control circuitry 30, wire 42 will cool, causing shutter 22 to return to its original (open) position in which camera 24 and lens 26 are uncovered. Normally closed shutter configurations may be used if desired. The arrangement of FIG. 5 is merely illustrative.

Figure 6:
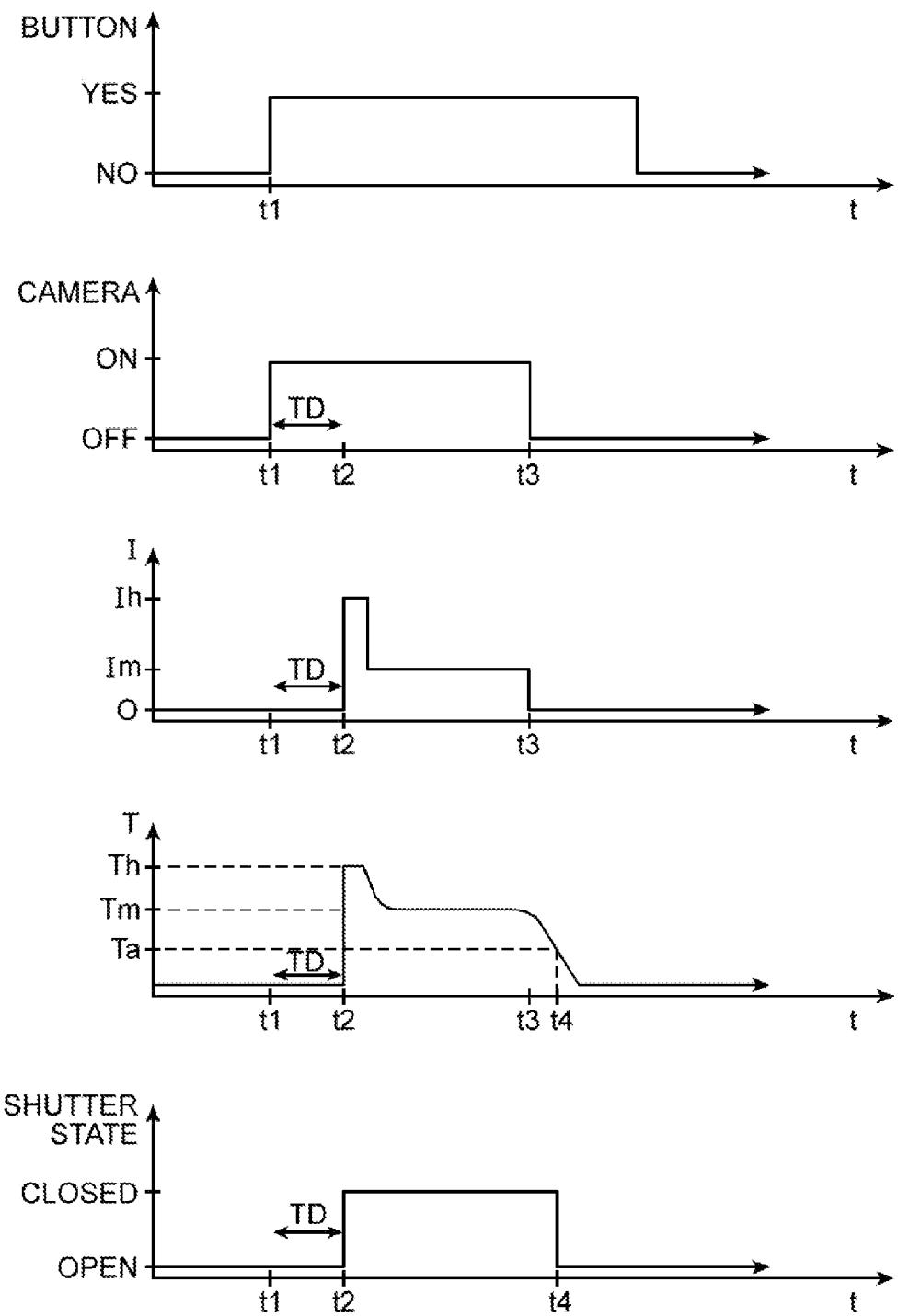
FIG. 6 is a set of signal traces showing show a camera system with a digital image sensor and a shape memory shutter may operate in an electronic device in accordance with an embodiment of the present invention.

The operation of shutter 22 in a typical usage scenario is illustrated by the signal traces of FIG. 6. The uppermost trace of FIG. 6 shows how a user may press a camera button at time t1. The camera button may be a physical button such as button 16 or a button on the sides of device housing 12 or other portions of device 10 or may be a virtual (on-screen) button that is displayed on display 14.

When the camera button or other image capture control is activated, camera 22 may begin acquiring a digital image using sensor 28, as indicated in the second trace of FIG. 6.

As indicated in the third trace of FIG. 6, after a delay time (exposure time) TD, control circuitry 30 may supply a control signal such as current I to shape memory wire 42. Initially, control circuitry 30 may supply the current at a relatively high value of Ih. After a brief delay, control circuitry 30 may lower the drive current for shutter 22 to a lower level Im.

When current is applied to the shape memory actuator structure formed from shape memory wire 42, the structure is Ohmically heated. As shown in the fourth trace of FIG. 6, the temperature T of wire 42 may rise rapidly at time t2, due to the application of current at current level Ih. The temperature T may, for example, rise above temperature Ta. When wire 42 rises above temperature Ta, the shape memory material in wire 42 transitions from its lower-temperature shape to its higher-temperature shape, thereby closing shutter 22 (i.e., placing shutter member 36 over camera 24), as shown in the fifth trace of FIG. 6. To hold shutter 22 in its closed position, control circuitry 30 may maintain temperature T above temperature Ta. For example, control circuitry 30 may apply current I at a maintenance level of Im. As shown in the fourth trace of FIG. 6, this ensures that temperature T will remain at temperature Tm.

By time t3, control circuitry 30 has read out the captured image data from image sensor 28. Control circuitry 30 may therefore reduce the drive current I to 0, thereby allowing wire 42 to cool. As shown in the fourth trace of FIG. 6, at time t4 the temperature T of wire 42 falls below temperature Ta, causing shape memory wire 42 to return to its low-temperature shape. This causes shutter 22 to return to its low-temperature state (i.e., its open state in this example).

Figure 7:
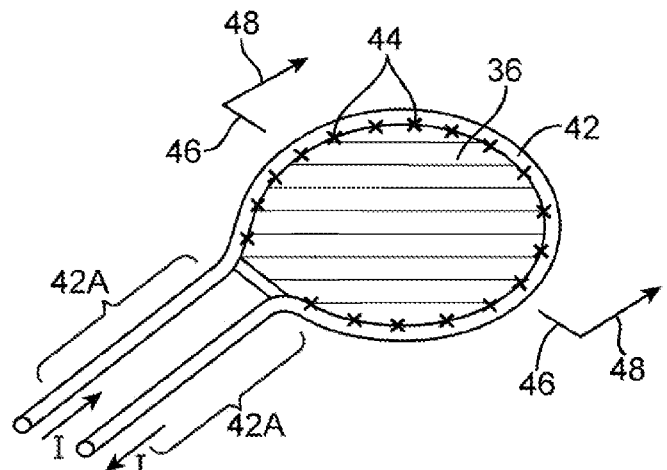
FIG. 7 is a perspective view of an illustrative shape memory shutter having a shutter material attached within a loop of shape memory wire in accordance with an embodiment of the present invention.

As shown in FIG. 7, shutter member 36 may be attached to looped wire 42 in a circular portion of looped wire 42. Shutter member 36 may be formed from plastic, metal or other conductive materials, fabric, epoxy or other solidified liquid polymers, or other suitable materials. Shutter member 36 may be formed from an integral part of a shape memory structure such as shape memory wire 42 or may be formed from one or more separate structures that are attached to a shape memory structure. In configurations in which shutter member 36 is formed from a conductive material, the current I that is passing through wire 42 will be distributed throughout member 36. In arms 42A, current I will be more concentrated (i.e., the current density will be elevated), facilitating localized resistive heating (also sometimes referred to as Joule heating or Ohmic heating) in the shape memory actuator formed from arms 42A.

Shutter member 36 may be attached to shape memory wire 42 using welds, adhesive, fasteners, solder, or other suitable attachment mechanisms (shown as connections 44 of FIG. 7).

Figure 8:
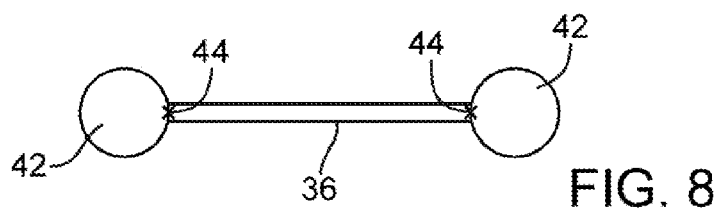
FIG. 8 is a cross-sectional view of a shape memory shutter in which a planar member has been attached to a loop of shape memory wire in accordance with an embodiment of the present invention.

FIG. 8 is a cross-sectional side view of shutter 22 of FIG. 7 in a configuration in which shutter member 36 has been formed from a planar sheet of material such as a sheet of plastic or metal. Connections 44 may be formed by welds, solder, adhesive, fasteners, crimps or other engagement features in member 36, etc.

Figure 9:
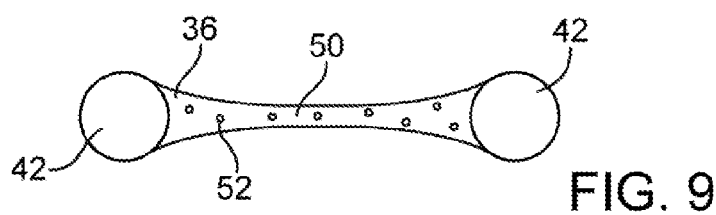
FIG. 9 is a cross-sectional view of a shape memory shutter in which a solidified liquid such as a liquid polymer has been formed across a loop of shape memory wire in accordance with an embodiment of the present invention.

FIG. 9 is a cross-sectional side view of shutter 22 of FIG. 7 in a configuration in which shutter member 36 has been formed from a planar sheet of material such as a liquid that has been solidified. The liquid may be, for example, a thermosetting or thermoplastic polymer. As shown in FIG. 9, member 36 may include a binder such as binder 50 and, if desired, incorporated materials such as material 52. Binder 50 may be a polymer (e.g., epoxy, a thermoplastic, etc.). Material 52 may be a pigment for ensuring that member 36 is opaque (e.g., carbon black, colored ink, metal particles, etc.).

Figure 10:
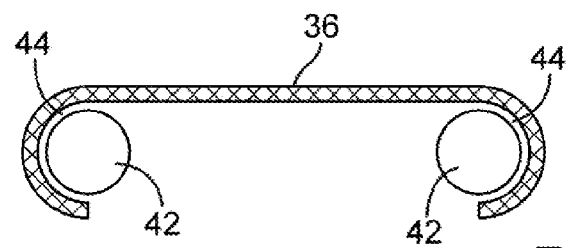
FIG. 10 is a cross-sectional view of a shape memory shutter in which a fabric member has been attached to a loop of shape memory wire in accordance with an embodiment of the present invention.

FIG. 10 is a cross-sectional side view of shutter 22 of FIG. 7 in a configuration in which shutter member 36 has been formed from a sheet of fabric. As shown in FIG. 10, connections 44 may be formed from a layer of adhesive that is interposed between the end portions of layer 36 and wire 42 (as an example).

Figure 11:
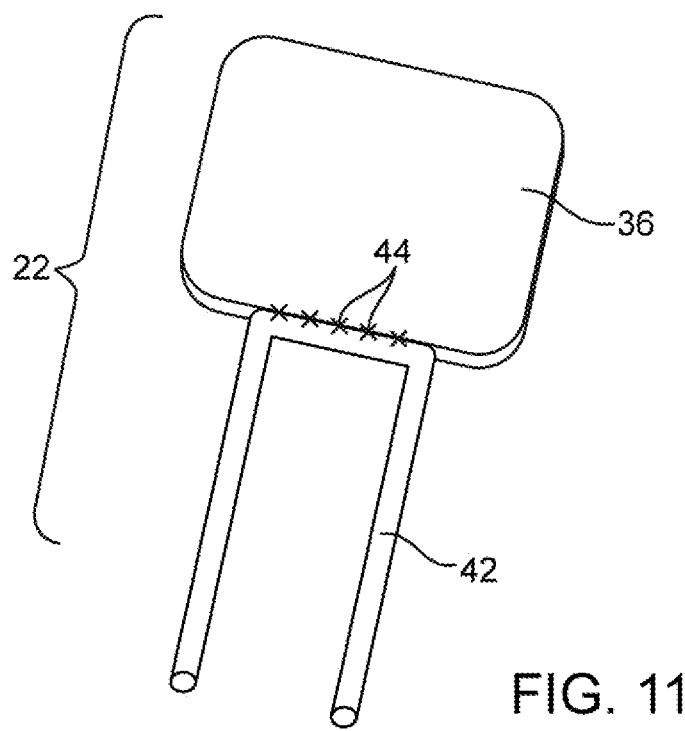
FIG. 11 is a perspective view of an illustrative shutter with a shutter member attached to a shape memory wire in accordance with an embodiment of the present invention.

If desired, opaque shutter member 36 may be attached to the end of wire loop 42 (i.e., the shape memory actuator), rather than being formed within a looped portion of wire loop 42. This type of configuration is shown in FIG. 11. As shown in FIG. 11, opaque shutter member 36 may be attached to shape memory wire 42 using connections 44 (e.g., welds, solder, adhesive, fasteners, engagement structures formed on wire 42 and/or member 36, etc.).

Figure 12:
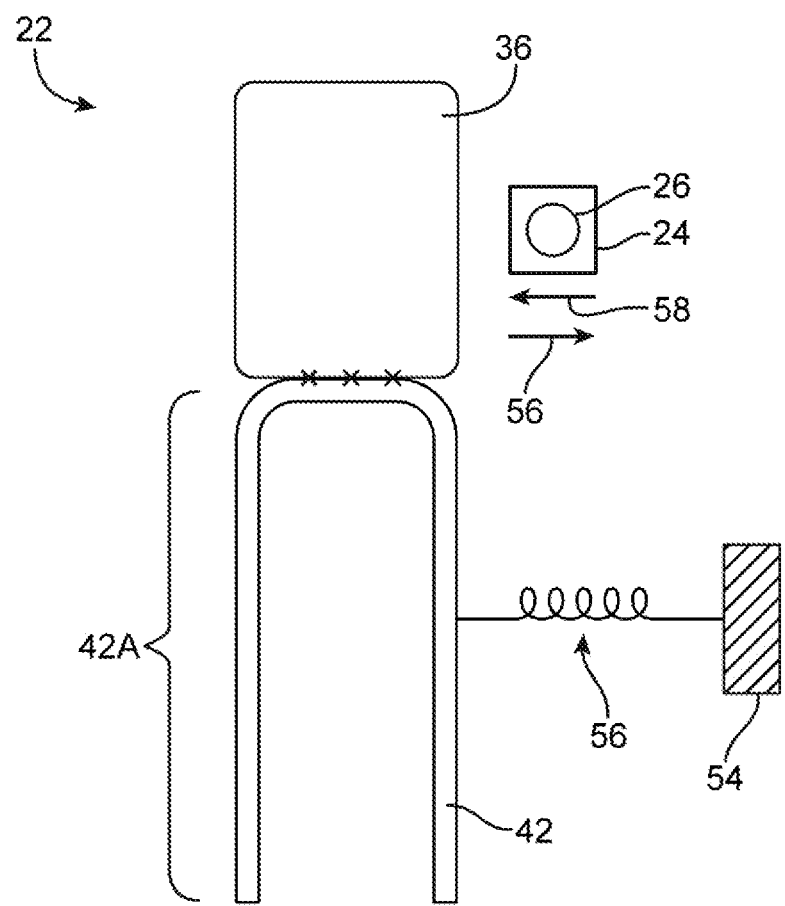
FIG. 12 is a top view of a shape memory shutter with a spring in accordance with an embodiment of the present invention.

Biasing structures such as one or more spring structures may be used in assisting the movement of shutter member 36. As shown in FIG. 12, for example, a biasing structure such as spring 56 may be coupled between wire 42 or other portions of shutter 22 (e.g., member 36) and a support structure such as support structure 54 (e.g., a portion of housing 12 or other structures in device 10). Spring 56 may be used to help pull shutter member 36 in direction 56 over camera 24 or may be used to help push shutter member 36 away from camera 24 in direction 58. For example, if shutter member 36 covers camera 24 when wire 42 is placed in its higher-temperature position, spring 56 may help push shutter member 36 away from camera 24 (i.e., spring 56 may serve to provide a restoring force that helps expedite the return of shutter 22 to its original low-temperature position). In general, shutter 22 may be positioned with the assistance of one or more springs, springs that push and/or pull, and/or springs that create a restoring force or that create a force that assists actuation of shutter 22 when heated. The biased shutter configuration of FIG. 12 is merely illustrative.

Figure 13:
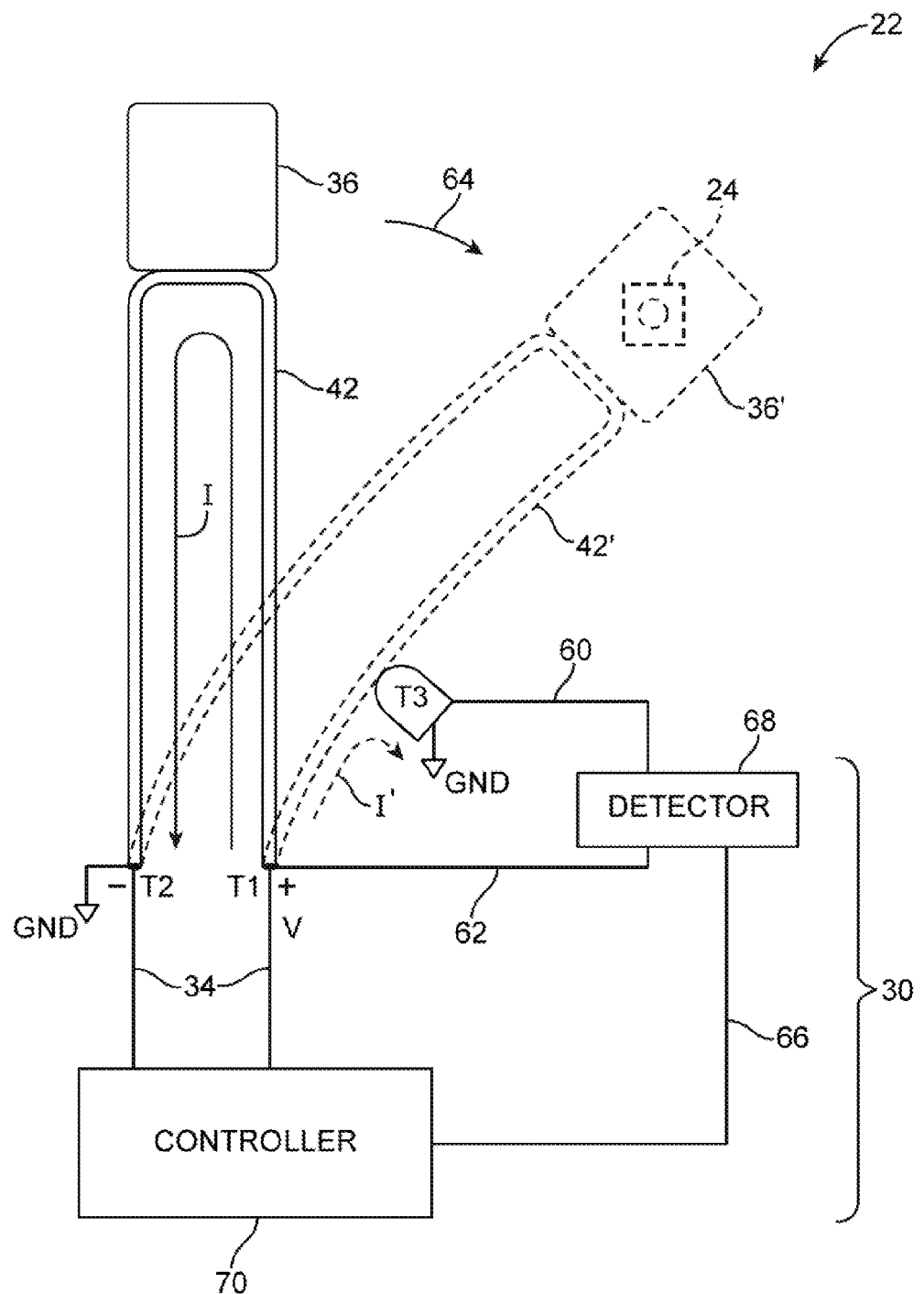
FIG. 13 is a diagram showing how a shape memory shutter may have a movement detection and shorting terminal in accordance with an embodiment of the present invention.

Shutter 22 may be provided with a movement detection mechanism. As shown in FIG. 13, shutter 22 may have a loop of shape memory wire that forms an actuator. Shutter 22 may, for example, have looped shape memory wire 42. Shutter member 36 may be formed from an opaque material and may be attached to the end of the actuator formed from looped wire 42. When heated by applying a signal to wire 42 from control circuitry 30, wire 42 may deform into its higher-temperature position (position 42'). The signal (e.g., current I) that is applied to wire 42 may be generated by supplying a voltage V (e.g., a positive or negative voltage) to terminal T1 and a ground voltage (e.g., 0 volts or other suitable voltage) to terminal T2. This causes current I to flow through wire 42 as shown in FIG. 13. When wire 42 has moved sufficiently in direction 64, shutter member 36 will be in position 36' (e.g., over camera 24) and wire 42 will be in position 42'. When wire 42 reaches position 42', wire 42 will contact terminal T3.

Control circuitry 30 may include controller 70 for applying current I to shutter actuator wire 42 and may include detector 68. Detector 68 may have a detection circuit that is coupled across terminals T1 and T3 by lines 62 and 60, respectively. When shutter 22 of FIG. 13 is in its open position, wire 42 will not contact terminal T3. When, however, current I is applied to wire 42 by controller 70 using terminals T1 and T2, wire 42 will bend into position 42', where the right-hand segment of wire 42 will contact terminal T3. When wire 42 in position 42' contacts terminal T3, the drive current that is being produced by controller 70 will be shunted through terminal T3 to ground terminal GND, as indicated by shorting current I' in FIG. 13. This may help to rapidly halt the application of drive current to the main loop portion of wire 42.

Detector 68 may use paths 60 and 62 to monitor the resistance (and/or current) between terminals T1 and T3 or other detection signal. When wire 42 is not in contact with terminal T3 (i.e., when shutter 22 is in its open position in this example), an open circuit will be present between terminals T1 and T3, so the resistance between terminals T1 and T3 will be high and I' will be zero. When wire 42 is in contact with terminal T3, a short circuit will be present between terminals T1 and T3 through a short segment of wire 42, so the resistance between terminals T1 and T3 will be low and I' will be high. Controller 70 may receive information on the resistance (current) between terminals T1 and T3 from detector 68 via path 66. During the process of closing shutter 22, drive current I may be applied to wire 42 to heat wire 42.

Control circuitry 30 can use detector 68 to monitor the resistance between terminals T1 and T3 as part of the shutter closing process. So long as the measured resistance between terminals T1 and T3 is high, controller 70 may continue to be used to apply the drive current to wire 42. In response to detecting a short circuit (i.e., a low resistance and/or high current) between terminals T1 and T3, control circuitry 30 may conclude that shutter 22 has fully reached its closed position. Control circuitry 30 may therefore take appropriate action. For example, control circuitry 30 may cease application of the drive current to wire 42 immediately upon detection of the closed state of shutter 22, control circuitry 30 may cease application of drive current to wire 42 after a predetermined delay following detection of shutter closure, control circuitry 30 may lower the drive current to reduced level for a predetermined amount of time and may then cease application of the drive current entirely, or control circuitry 30 may take other suitable action.

If desired, wire 42 may be configured to follow a three-dimensional path during the process of opening and closing shutter 22 (i.e., wire 42 need not simply bend and straighten within a single plane, but may make more complicated motions in multiple dimensions). This type of arrangement is shown in FIGS. 14, 15, and 16.

Figure 14:
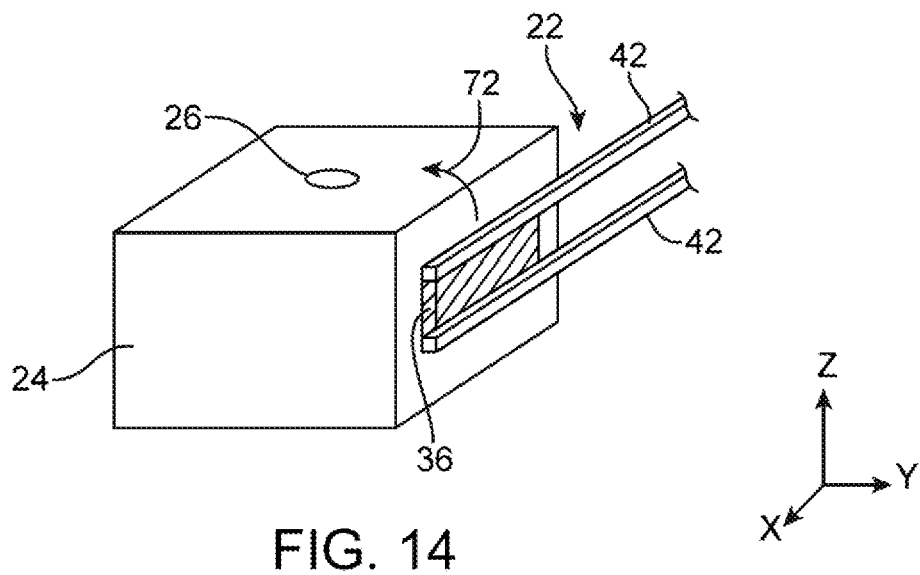
FIG. 14 is a perspective view of an illustrative camera system with a shape memory shutter that is in an open position in accordance with an embodiment of the present invention.

FIG. 14 is a perspective view of a shutter in an open position. As shown in FIG. 14, shutter 22 may have shape memory wire 42 and shutter member 36. Shutter 22 is in its open position in FIG. 14, so that lens 26 of camera 24 is not covered by shutter 22.

When it is desired to close shutter 22, current may be applied to wire 42 to heat wire 42. This causes wire 42 to follow path 72, until shutter 22 assumes the closed position of FIG. 15.

Figure 15:
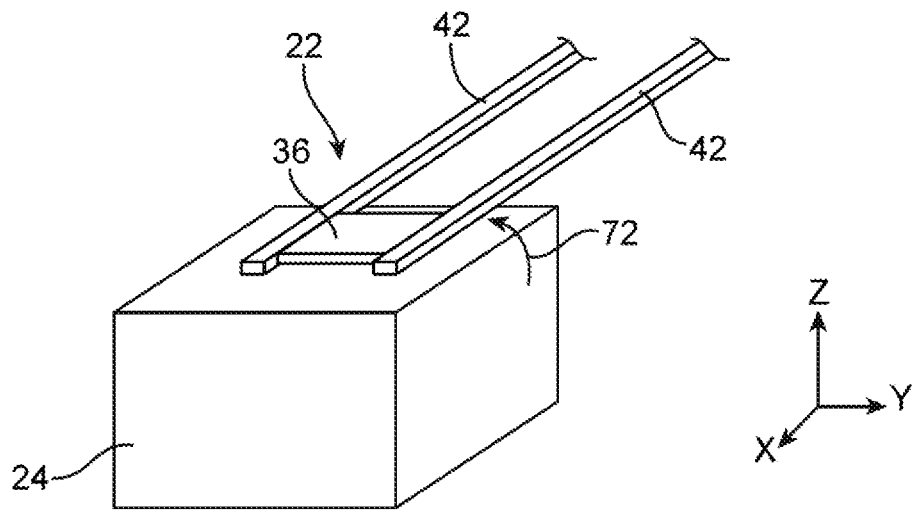
FIG. 15 is a perspective view of the illustrative camera system of FIG. 14 in which the shape memory shutter is in a closed position in accordance with an embodiment of the present invention.
Figure 16:
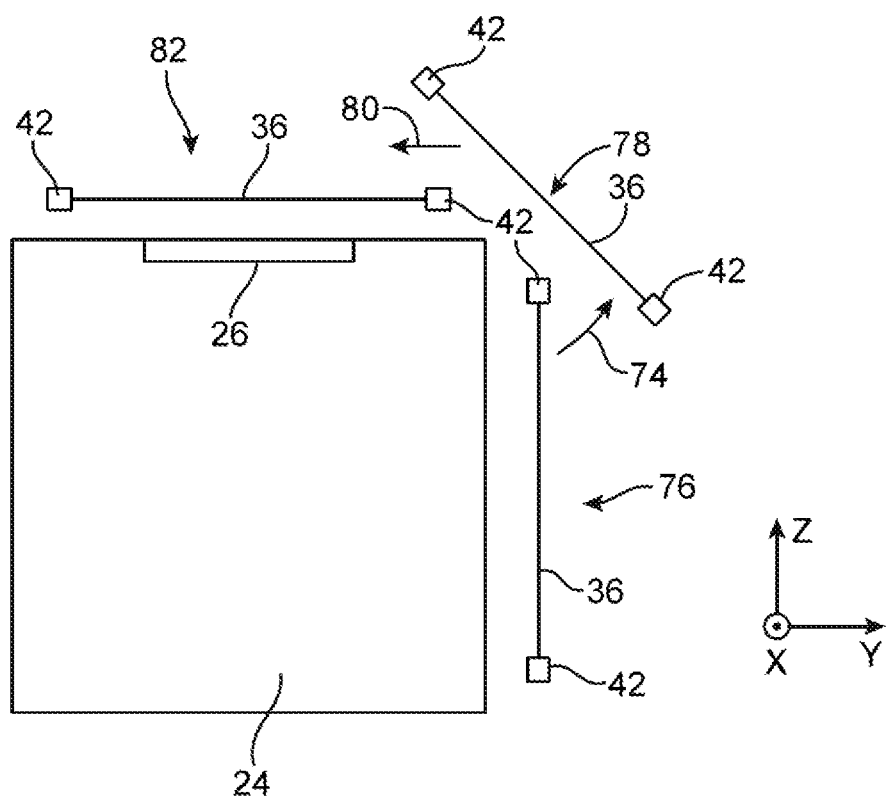
FIG. 16 a side view of camera system of the type shown in FIGS. 14 and 15 showing how a shutter may be deployed in accordance with an embodiment of the present invention.

FIG. 16 is a side view of camera 24 of FIG. 15 showing the movement of shutter 22 from its open to its closed position. Initially, shutter 22 may be in open position 76. In this position, wires 42 are located in the XZ plane of FIG. 16, alongside the right edge of the camera module housing form camera 24. As wire 42 is heated, shutter 22 moves in direction 74 to intermediate position 78. Continued heating of wire 42 causes wire 42 to move in direction 80 to closed position 82 in which shutter member 36 blocks lens 26 of camera 24. In position 82, shutter member 36 may lie in the XY plane of FIG. 16.

In shutter configurations of the type shown in FIGS. 14, 15, and 16, it may be desirable for wire 42 to trace out paths that do not lie exclusively in one plane during the process of opening and closing shutter 22. For example, wire 42 of FIG. 16 may first travel vertically in dimension Z and may then travel horizontally along dimension Y. This type of complex behavior may be achieved by providing wire 42 with multiple segments.

Figure 17:
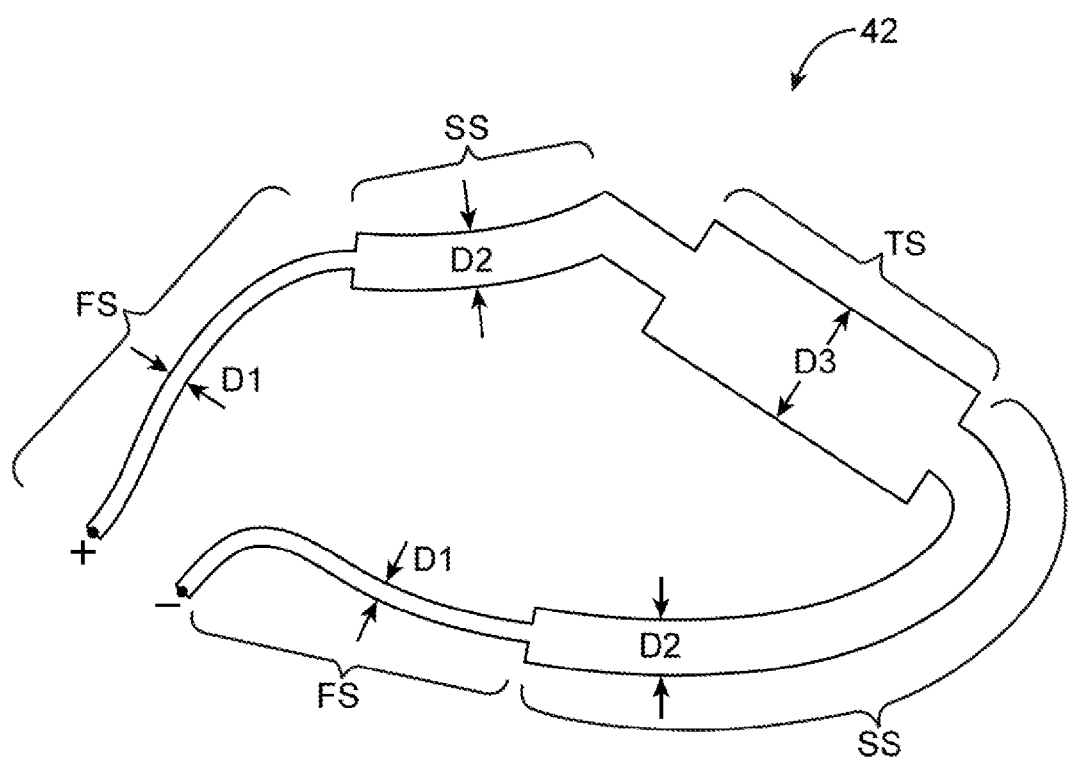
FIG. 17 is a diagram of a shape memory structure with multiple diameters that may be used as a shutter actuator in accordance with an embodiment of the present invention.

An illustrative multi-segment configuration of the type that may be used for wire 42 is shown in FIG. 17. As shown in the FIG. 17 example, wire 42 may have segments FS, SS, and TS (or more segments or fewer segments). Segments FS, SS, and TS may have different transverse dimensions. For example, segments FS may have a diameter D1, segments SS may have a diameter D2, and segment TS may have a diameter D3, where D1<D2<D3. As current is applied to wire 42 of FIG. 17, Ohmic heating will cause the temperature in segments FS to rise more quickly than the temperature in segments SS and TS and will cause the temperature in segments SS to rise more than in segments FS, but less than in segments TS. Because the temperature in segments FS will be greater than that of segments SS and TS, segments FS will be the first to transition between their lower-temperature shape and their higher-temperature shape (e.g., so that shutter 22 is caused to move vertically in dimension Z). Once segments SS have been heated sufficiently (e.g., after segments FS have already transitioned to their higher-temperature shapes), segments SS will transition from their lower-temperature shapes to their higher-temperature shapes (e.g., so that shutter 22 is caused to move horizontally in dimension Y).

Shape memory wire 42 may be provided with any suitable number of segments having different diameters. In the example of FIG. 17, there are two thinner segments, two medium segments, and one wider segment. This is merely illustrative. In general, wire 42 may have one or more, two or more segments of different diameters, three or more segments of different diameters, four or more segments of different diameters, five or more segments of different diameters, six or more segments of different diameters, etc.

Figure 18:
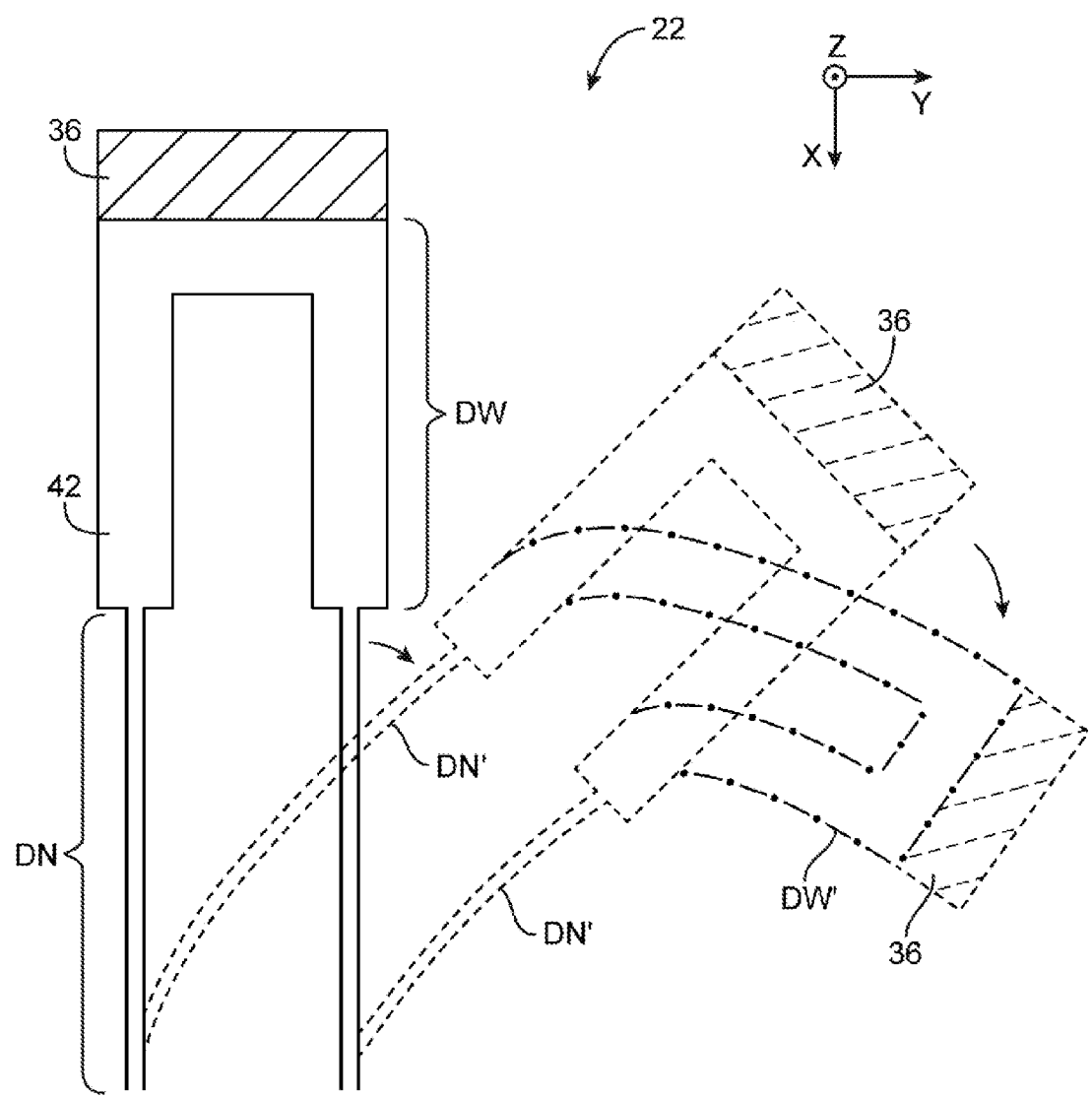
FIG. 18 is a diagram showing how a shape memory shutter actuation structure with multiple diameters may be deployed in accordance with an embodiment of the present invention.

It is not necessary for shutter 22 to move in multiple dimensions in configurations in which shape memory wire 42 is provide with segments of different diameters. Consider, as an example, shutter 22 of FIG. 18. As shown I FIG. 18, shutter 22 moves substantially within the XY plane, without protruding significantly into the Z direction during the process of opening and closing shutter 22. Initially, when narrower segments DN of wire 42 have heated sufficiently, segments DN will transition from their lower-temperature shape (e.g., straight) to their higher-temperature shape (e.g., curved shape DN'). Following additional application of drive current to wire 42, the temperature in segments DW will rise sufficiently to cause segments DW to transition from their lower-temperature shape (e.g., straight) to their higher-temperature shape (e.g., curved shape DW'). This type of compound movement of wire 42 may help move shutter member 36 past obstacles within device 10 during operation.

Figure 19:
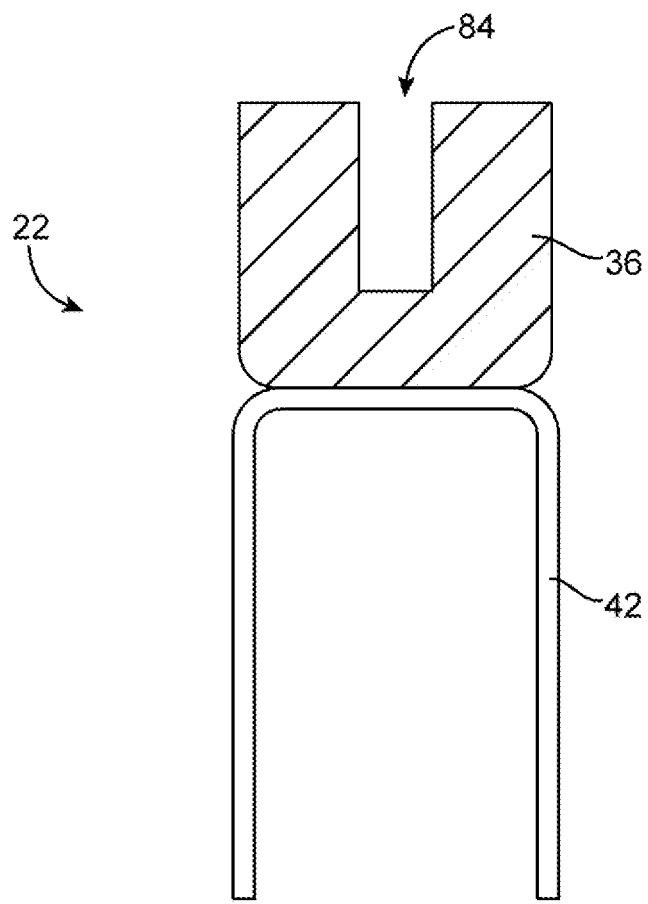
FIG. 19 is a diagram of a shutter with an opening in accordance with an embodiment of the present invention.

As shown in FIG. 19, shutter member 36 of shutter 22 need not have a solid uninterrupted layout. Rather, shutter member 36 may have a surface area that is divided into one or more opaque regions using an opening such as open-ended slot opening 84 (as an example). Shutter 22 may have one or more openings such as opening 84. Openings such as opening 84 may be square, rectangular, oval, circular, etc. As shutter 22 moves past camera 24 (e.g., past lens 26), light may momentarily pass through opening 84 in shutter member 26 (e.g., opening 84 may serve to provide an closed-open-closed feature for shutter 22).

Figure 20:
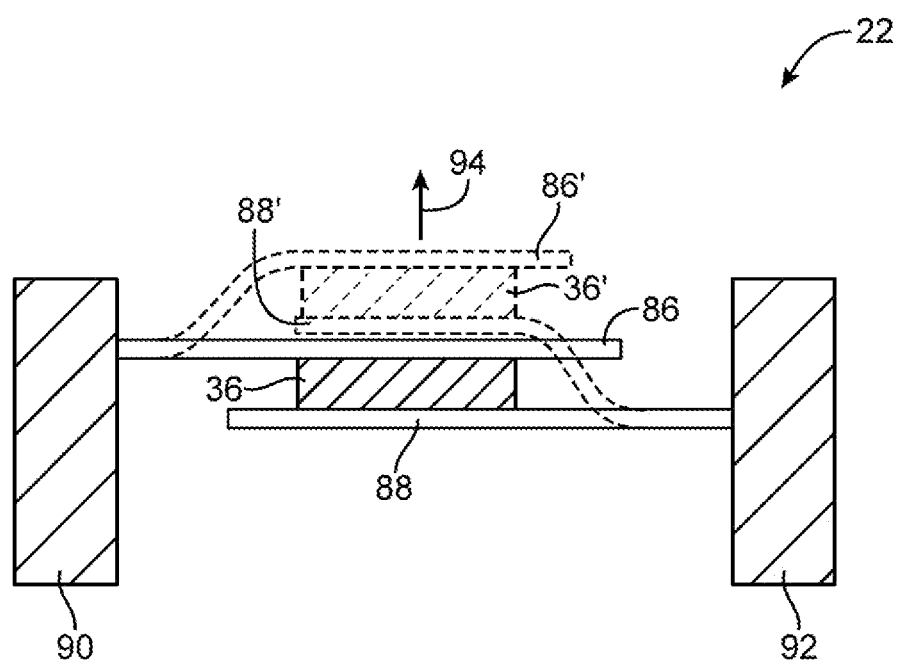
FIG. 20 is a diagram of a shutter having shape memory actuator arms mounted to structures located at opposing ends of the shutter in accordance with an embodiment of the present invention.

As shown in FIG. 20, a shape memory actuator may be formed from shape memory arms such as arms 86 and 88 that are mounted to shutter member 36 from opposing sides of device 10. Arm 86 may be attached to support structure 90. Arm 88 may be attached to support structure 92. When heated, arm 86 may move to position 86' and arm 88 may move to position 88'. The movement of arms 86 and 88 causes shutter member 36 to move in direction 94 to position 36', thereby closing (or opening) shutter 22. Support structures 90 and 92 may be formed from portions of housing 12 (e.g., housing sidewalls, rear or front planar housing structures, internal housing frame members or other internal housing members, or other housing structures) or may be formed from other structures in device 10. Arms 86 and 88 may be formed from respective loops of shape memory wire 42 or arm 86 may form a first segment of wire 42 and arm 88 may form a second (series-connected) segment of wire 42.

Figure 21:
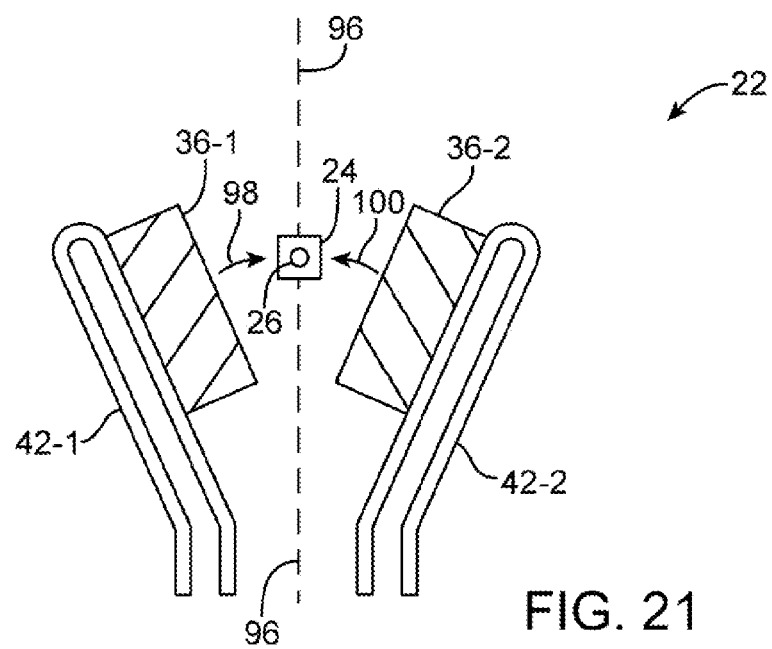
FIG. 21 is a diagram of a shape memory camera shutter having multiple shutter structures in accordance with an embodiment of the present invention.

If desired, shutter 22 may include a pair of arms that carry respective portions of shutter member 36. As shown in FIG. 21, for example, first shape memory wire loop 42-1 may be used to support first shutter member 36-1 and second shape memory wire loop 42-2 may be used to support second shutter member 36-2. When shutter 22 is in its open position (as shown in FIG. 21), shutter members 36-1 and 36-2 may be separated from each other to allow light to reach camera 24 and lens 26. When driven with control signals, wires 42-1 and 42-2 may heat sufficiently to cause wire 42-1 to move shutter member 36-1 inwardly in direction 98 and to cause wire 42-2 to move shutter member 36-2 inwardly in direction 100. In the closed position for shutter 22, shutter members 36-1 and 36-2 may meet along line 96 (with or without a slight overlap) to form a shutter structure that blocks light from camera 24.

Figure 22:
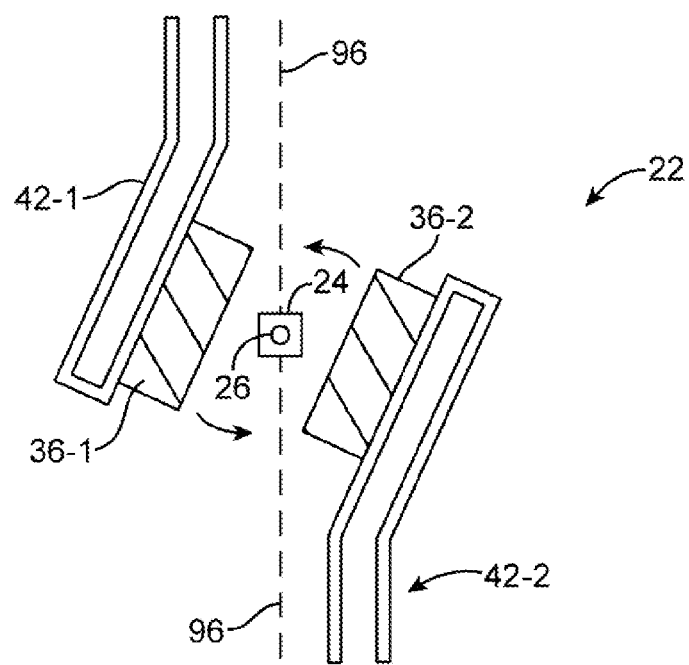
FIG. 22 is a diagram of a shape memory camera shutter having multiple shutter structures and having shape memory actuator arms that are mounted to support structures located at opposing ends of the shutter in accordance with an embodiment of the present invention.

FIG. 22 is a diagram showing how shutter members 36-1 and 36-2 may be mounted on shape memory arms 42-1 and 42-2 that extend in opposing directions.

Figure 23:
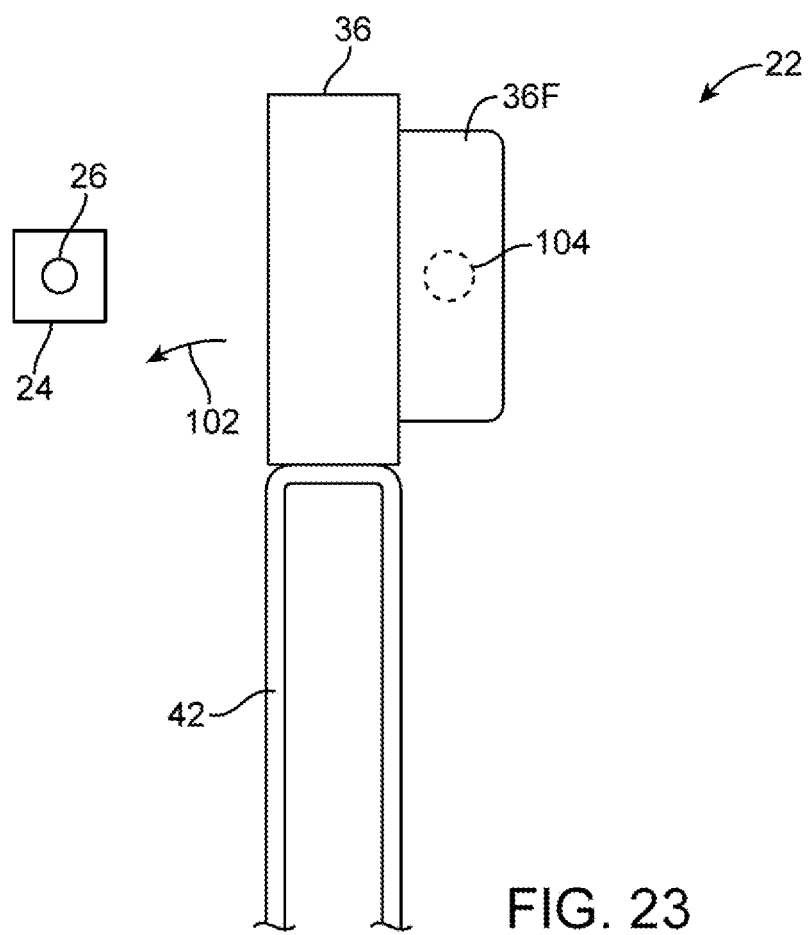
FIG. 23 is a diagram of an illustrative shape memory camera shutter having an optical filter and an opaque shutter member in accordance with an embodiment of the present invention.

As shown in FIG. 23, shutter 22 may include a filter structure such as filter structure 36F. Filter structure 36F may be mounted to shape memory wire 42 (with or without shutter member 36) or, as shown in FIG. 23, filter structure 36F may be mounted to shutter member 36. Shutter member 36 of FIG. 23 may be formed from an opaque structure (e.g., one or more structures formed from metal, polymer, polymer with opaque particles, etc.).

Filter structure 36F may be a layer of material that is at least partly transparent to light. For example, filter 36F may be formed from a layer of glass or plastic. Filter 36F may, as an example, be formed from a colored polymer or other colored material such as a transparent red layer, a transparent blue layer, a transparent green layer, or a transparent layer of another color. If desired, filter 36F may be formed from a transparent gray layer that serves as a neutral density filter. Filter structures 36F that include transparent materials of more than one color or density may also be used in shutter 22. Filter structures 36F may also be used to form a functional element for camera 24. For example, filter structures 36F may form a polarizer, a neutral density filter or filters, an infrared pass filter, an infrared block filter, special effects filters (e.g., prisms, starburst effects, diffuser effects, etc.) or other filters for camera 24.

As shown in the illustrative arrangement of FIG. 23, filter structure 36F may be configured to cover an optical component such as optical component 104. Optical component 104 may be a light source (e.g., a light-emitting diode such as a white or colored light-emitting diode), a camera (e.g., a digital image sensor), an optical component (or components) associated with a proximity sensor such as an infrared light-emitting diode and corresponding light sensor, or other components that emit or sense light.

The movement of shape memory wire 42 may be used to move shutter member 36 and/or filter structure 36F relative to components in device 10 such as optical component 104 and/or camera 24. As an example, a signal may be applied to looped shape memory wire 42 to cause wire 42 to move from its lower-temperature shape (shown in FIG. 23) to its higher-temperature shape, thereby moving shutter member 36 and filter structure 36F in direction 102. When shutter 22 is actuated in this way, shutter member 36 may cover camera 24 while filter structure 36F uncovers optical component 104.

As one illustrative example, consider a scenario in which optical component 104 is a light-emitting diode that is used for illuminating a subject (e.g., for autofocus support and/or red-eye reduction). When filter structure 36A is present, filter structure 36A may be used to impose a color or neutral density on source 104. When shutter 22 is moved in direction 102, filter 36F may uncover source 104, so that source 104 may be used at its maximum intensity (e.g., to serve as a flash for a still photograph).

If desired, filter structure 36F may be used as part of a status indicator structure. For example, when it is desired to emit illumination with a first color (e.g., red) to indicate the presence of a first condition, filter structure 36F may be placed over light-emitting diode 104. When it is desired to emit illumination with a second color (e.g., white), filter structure 36F may be moved in direction 102 to uncover light-emitting diode 104 (e.g., a white light-emitting diode in this example).

Figure 24:
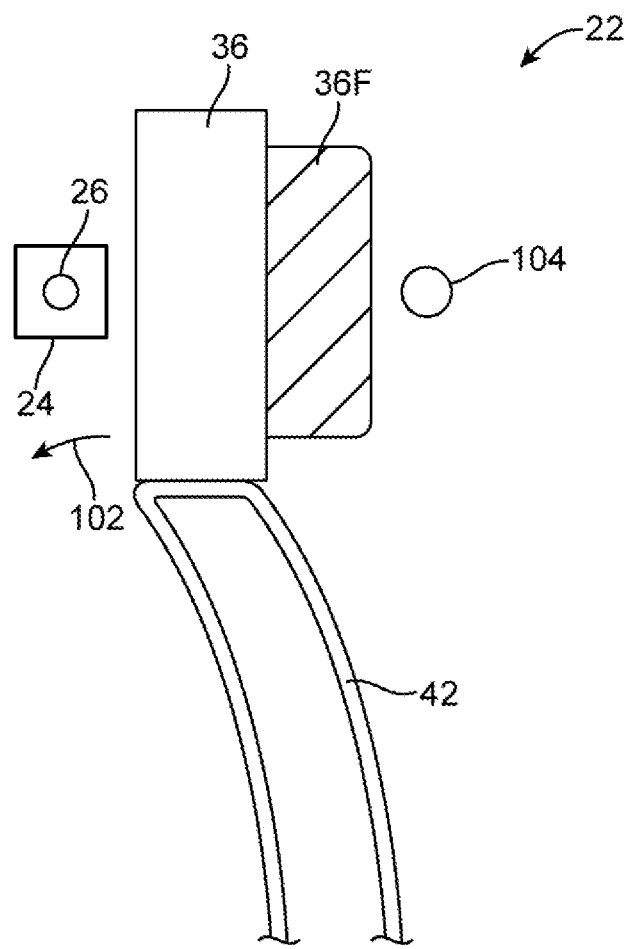
FIG. 24 is a diagram of the illustrative shape memory camera shutter of FIG. 23 following movement of the filter to reveal an underlying optical component such as a light source in accordance with an embodiment of the present invention.
Figure 25:
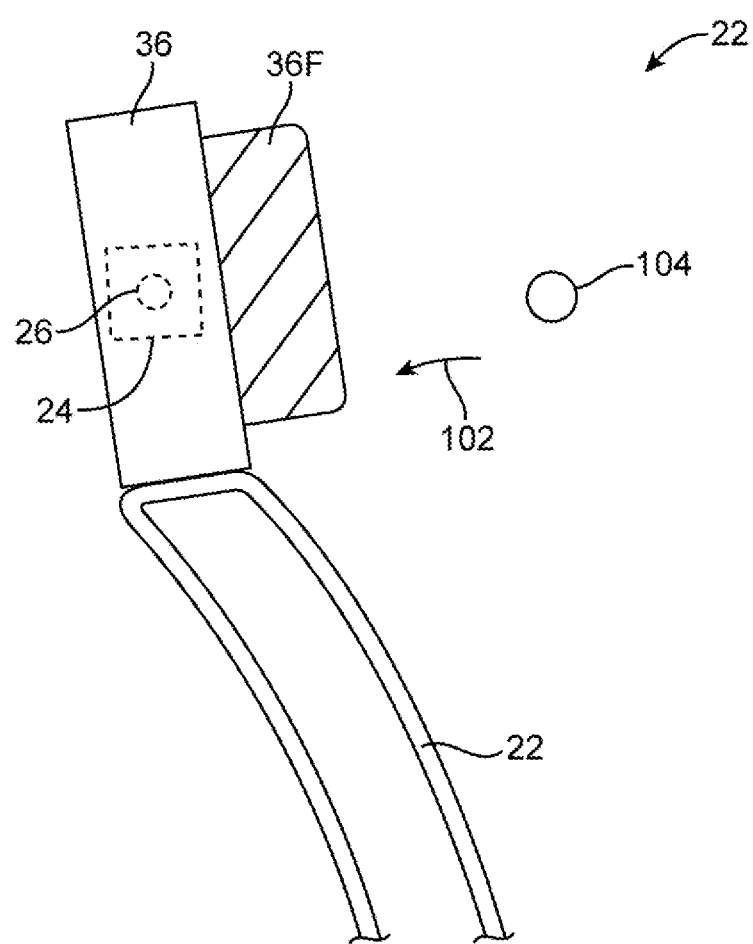
FIG. 25 is a diagram of the illustrative shape memory camera shutter of FIG. 23 following movement of the shutter to block a camera with an opaque shutter member in accordance with an embodiment of the present invention.

FIG. 24 shows how shutter member 36 and filter structure 36F may appear when shape memory wire 42 has been moved in direction 102 by an amount that is sufficient to cause filter structure 36F to uncover optical component 104 (e.g., a light-emitting diode being used as a camera flash), without allowing shutter member 36 to cover camera 24, so that camera 24 can acquire an image. In the position shown in FIG. 25, wire 42 has been moved sufficiently in direction 102 to cause shutter member 36 to cover camera 24 (i.e., shutter 22 has been placed in its closed position).

Figure 26:
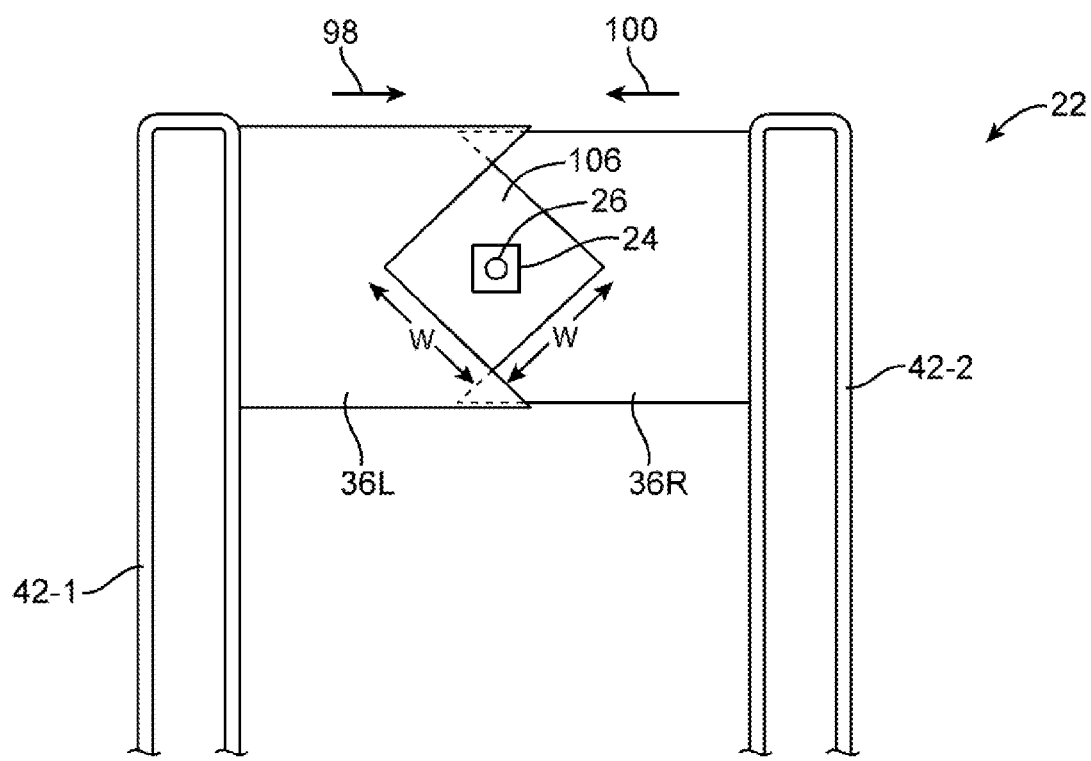
FIG. 26 is a diagram of an illustrative shape memory camera shutter with an aperture in accordance with an embodiment of the present invention.

As shown in FIG. 26, shutter 22 may be provided with an aperture such as aperture 106. When shutter 22 is in its open position, aperture 106 may be configured to allow a desired amount of light to reach camera 24. Shutter 22 may be formed from two opposing shutter members: shutter member 36L and shutter member 36R. When shape memory arms 42-1 and 42-2 are actuated, shutter member 36L may be moved in direction 98 while shutter member 36R is moved in opposing direction 100. This closes aperture 106 and shutter 22. Shape memory wire 42 may be configured to move between two positions (e.g., a position in which aperture 106 has a maximum value and a position in which aperture 106 is closed to close shutter 22) or may be configured to move between three or more positions (e.g., various different open aperture values and a closed position). Aperture 106 may be formed by creating notches (e.g., triangular notches) in the leading edges of members 36L and 36R as shown in FIG. 26, or by creating aperture openings in shutter members 36L and 36R using other suitable shapes. As shown in FIG. 26, aperture 106 may, as an example, have a square shape with edges of length W.

Figure 27:
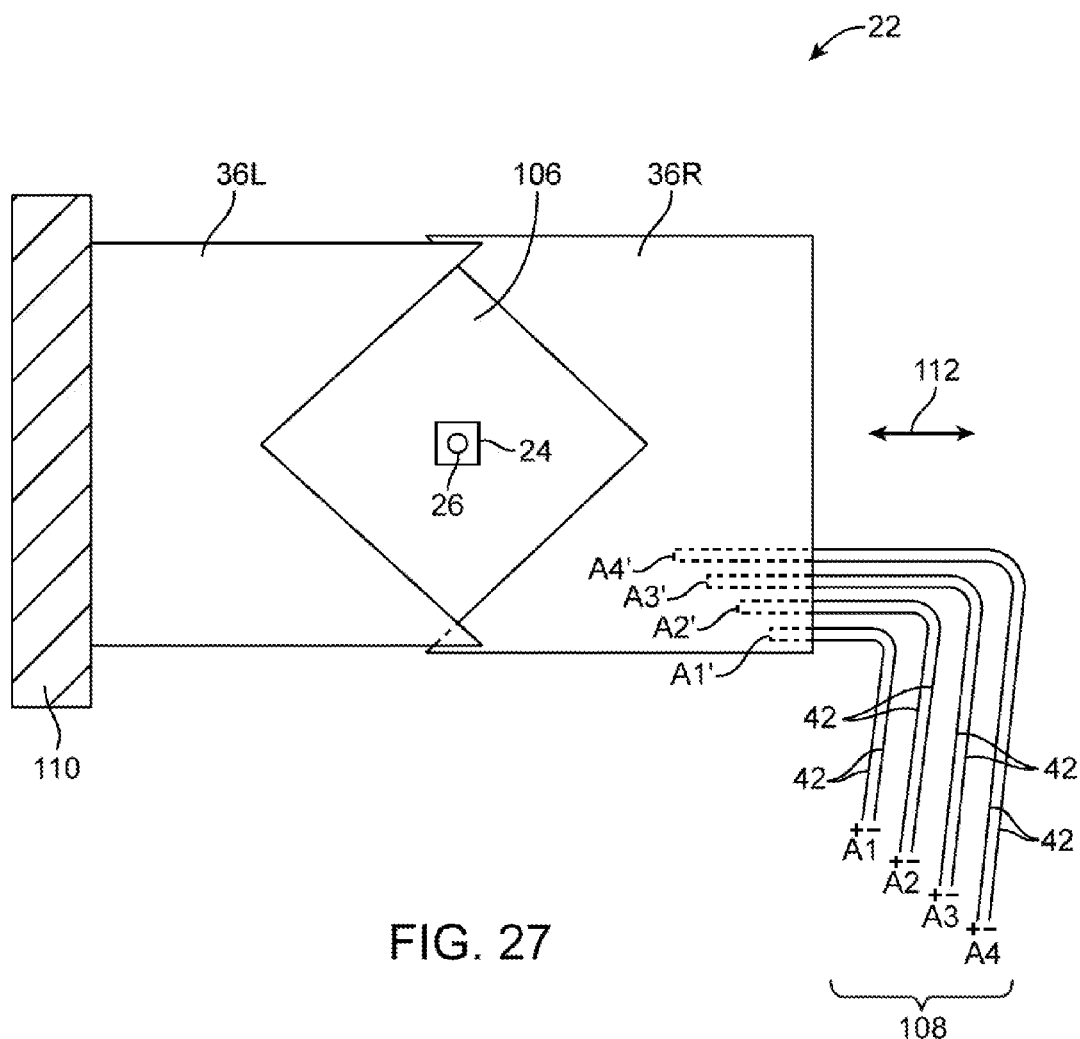
FIG. 27 is a diagram of an illustrative shape memory camera shutter with an aperture that may be adjusted using multiple shape memory actuating structures in accordance with an embodiment of the present invention.

A shutter such as shutter 22 of FIG. 26 may, if desired, be controlled by a shape memory actuator with multiple positions. One way in which to form a shape memory wire multi-position actuator involves the use of multiple wire diameters along wire loop 42, as described in connection with FIG. 17. Another way in which to form a multi-position actuator involves the use of multiple subactuators. This type of arrangement is shown in shutter 22 of FIG. 27. As shown in FIG. 27, shutter 22 may have overlapping notched shutter members such as shutter member 36L and shutter member 36R for providing shutter 22 with aperture 106. Shutter member 36L may be attached to fixed support structure 110 (e.g., a housing structure). Shutter member 36R may move along horizontal directions 112 under the control of actuator 108.

Actuator 108 may include multiple subactuators such as actuators A1, A2, A3, and A4. Each of actuators A1, A2, A3, and A4 may be formed from a respective loop of shape memory wire 42 and may be individually controlled by control circuitry 30 to control the horizontal placement of shutter member 36R. When it is desired to place shutter 22 in a first configuration so that aperture 106 exhibits a first aperture value, actuator A1 may be activated to move its tip to position A1'. When it is desired to place shutter 22 in a second configuration so that aperture 106 exhibits a second aperture value that is smaller than the first aperture value, actuator A2 may be activated to move its tip to position A2'. Actuator A3 may be activated to move its tip to position A3' when it is desired to place shutter 22 in a third configuration, so that aperture 106 exhibits a third aperture value that is smaller than the second aperture value. When it is desired to place shutter 22 in a closed configuration in which aperture 106 and shutter 22 are completely closed, actuator A4 may be activated to move its tip to position A4'.

Figure 28:
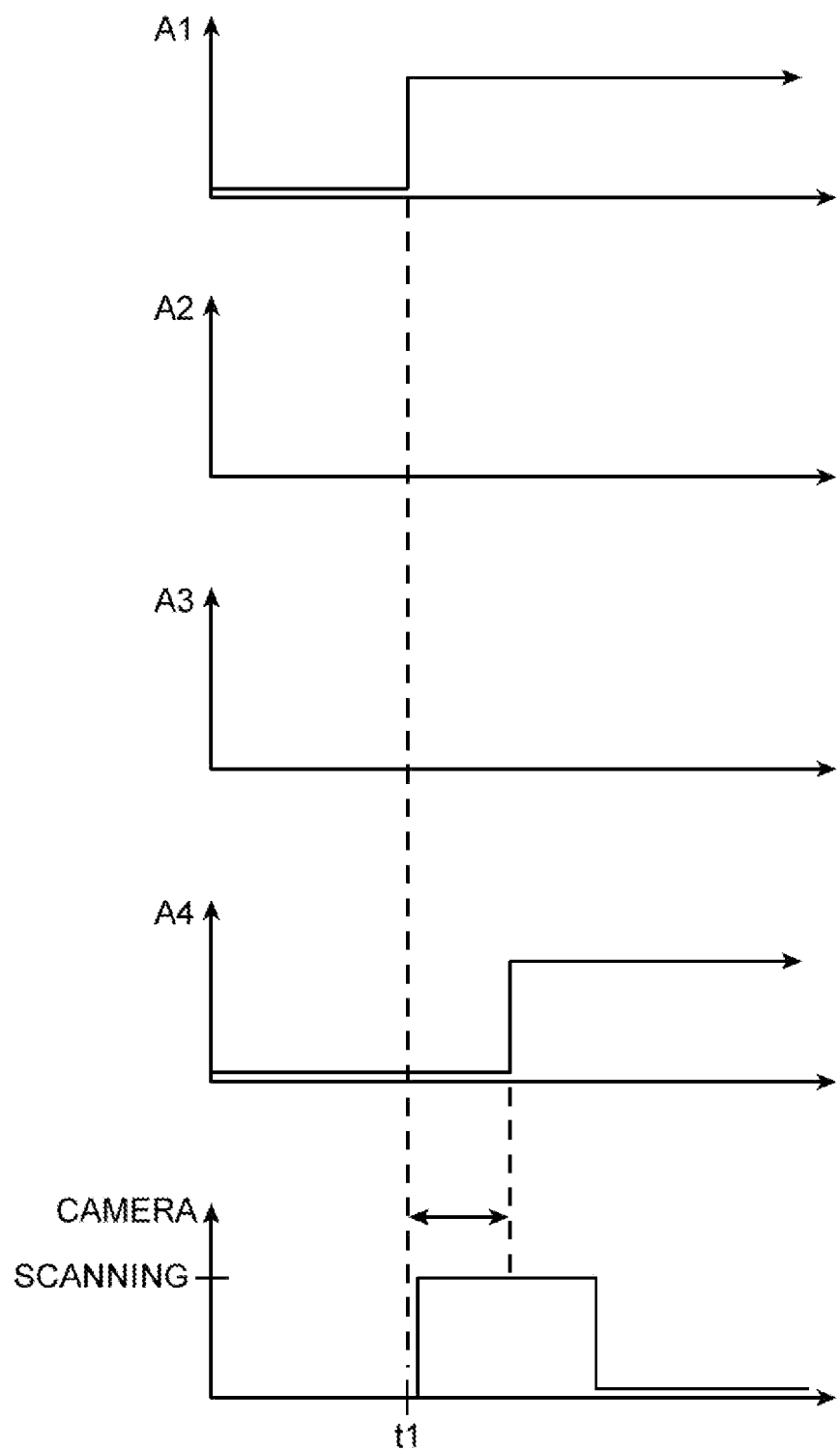
FIG. 28 contains signal traces associated with the operation of the illustrative shape memory camera shutter of FIG. 27 in accordance with an embodiment of the present invention.

FIG. 28 is a set of traces that illustrate how actuator 108 of FIG. 27 may be used in shutter 22 of FIG. 27. In the example of FIG. 28, a user desires to acquire a digital image using camera 24. Due to lighting conditions, the user (or an automatic exposure system implemented on the control circuitry of device 10), chooses to place aperture 106 in its first configuration by activating actuator A1 at time t1 (see the uppermost trace in FIG. 2). Actuators A2 and A3 need not be used in this example, as shown by the second and third traces of FIG. 28. After camera 24 has been used to acquire an image using the first aperture value (as shown in the fifth trace of FIG. 28), the control circuitry of device 10 may use actuator A4 to close shutter 22 completely (as shown in the fourth trace of FIG. 28). As this example demonstrates, shutter 22 may have multiple apertures that are selected using a shape memory actuator such as actuator 108 of FIG. 27. In general, shutter 22 may be provided with any suitable number of different apertures and may be provided with apertures of any suitable size and shape. The configuration of FIG. 27 is merely illustrative.

Figure 29:
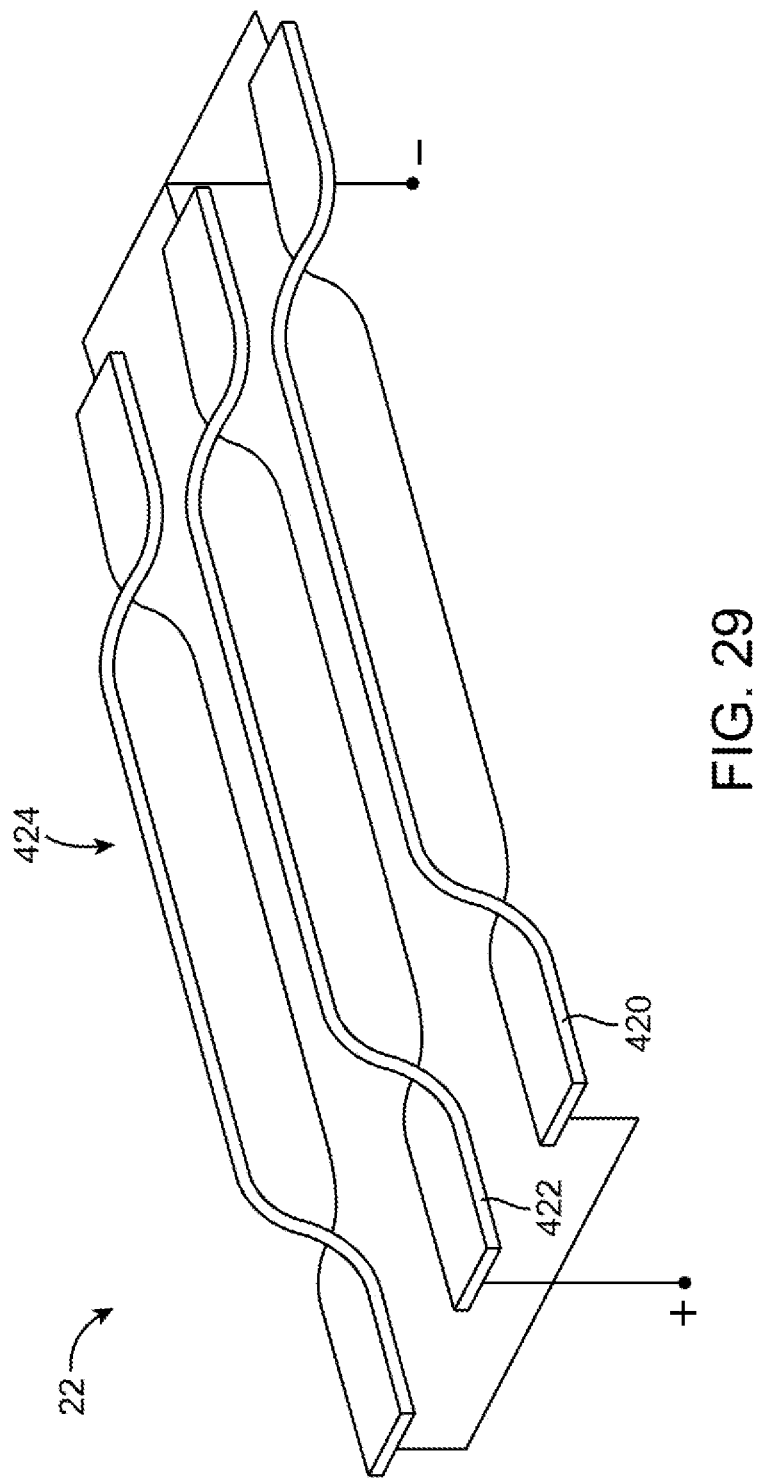
FIG. 29 is a perspective view of an illustrative shape memory shutter with twistable shutter members in accordance with an embodiment of the present invention.

Shutter 22 may be implemented using shape memory structures that twist when heated. An illustrative shape memory shutter of this type is shown in FIG. 29. As shown in FIG. 29, shutter 22 may include shutter member structures formed from shape memory wire 42 such as shutter structure 420, shutter structure 422, and shutter structure 424. Shutter structures 420, 422, and 424 may be formed from twisted strips of shape memory metal having a lower-temperature shape of the type shown in FIG. 29. When a drive current is applied to the shutter structures of FIG. 29 between terminals (−) and (+), the shutter structures of FIG. 29 may twist into a closed position (i.e., the shutter structures serve as light-blocking louvers).

A cross-sectional side view of shutter 22 of FIG. 29 is shown in FIG. 30. In the configuration of FIG. 30, shutter 22 is in its open position to allow light 114 to reach camera 24. When a drive signal is applied to shutter structures 420, 422, and 424 to heat shutter structures 420, 422, and 424, shutter structures 420, 422, and 424 may transition from their lower-temperature (e.g., twisted) shape in which shutter 22 is open (FIG. 30) to a higher-temperature (e.g., untwisted) shape in which shutter 22 is closed (FIG. 31). As shown in FIG. 31, the higher-temperature position of shutter structures 420, 422, and 424 may block light 114 so that light 114 does not reach camera 24.

Figure 32:
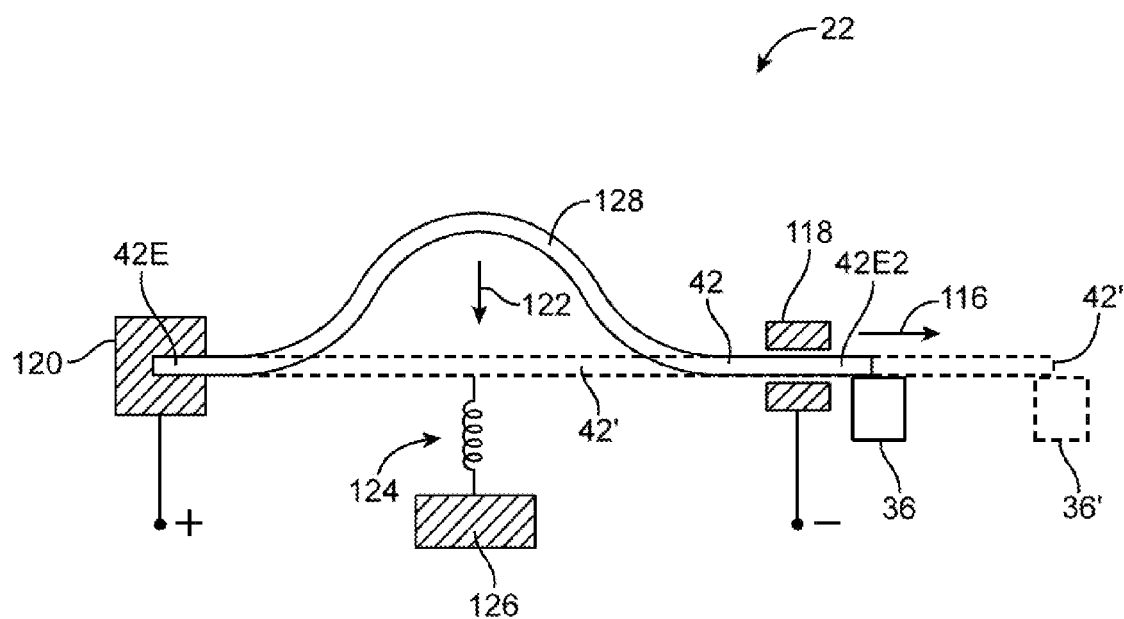
FIG. 32 is a diagram of an illustrative shape memory shutter with a linear shape memory actuator in accordance with an embodiment of the present invention.

As shown in FIG. 32, shutter 22 (or other shape memory devices such as adjustable filters, etc.) may be implanted using a shape memory actuator with a linear travel. In the FIG. 32 example, shutter 22 has been formed from shape memory wire 42. Current may be applied to wire 42 to heat wire 42 via terminals (+) and (−). Terminal (+) may be coupled to conductive support structure 120. Terminal (−) may be coupled to conductive support structure 118. Structure 120 may be a housing structure or other fixed structure that holds end 42E of wire 42 in a fixed position within device 10. Structure 118 may have an opening through which end 42E2 passes. When heated, shape memory wire 42 may transition from its lower-temperature shape (shown in FIG. 32) to position 42'. In making this transition, bent portion 128 of wire 42 may be pulled in direction 122 by spring 124 or spring 124 may be used to provide an upwards restoring bias to wire 42 when wire 42 is cooled. Spring 124 may be coupled between wire 42 and a support structure such as support structure 126. When heated, shutter member 36 (e.g., a member attached to end 42E2 of wire 42) may be moved to position 36' (e.g., a closed shutter position).

Device 10 may include one or more shape memory actuators. Shape memory actuators may be formed from heated shape memory wire or other structures formed from shape memory material. The actuators may be used to move shutter members, filter members, or other device structures. Shutter members may be formed from plastic, metal, or other suitable materials. If desired, portions of a shape memory actuator such as a looped shape memory wire structure or twisted wire strips may be used to form an integral shutter member. Linear and/or rotational actuators may be formed using shape memory material. The shape memory actuators may be used to form shutters, multi-colored status indicator lights, camera flash structures with one or more colors and/or brightness settings, adjustable filters, or other suitable components.

The foregoing is merely illustrative of the principles of this invention and various modifications can be made by those skilled in the art without departing from the scope and spirit of the invention. Any of the foregoing embodiments may be used alone or in combination with one or more of any of the other foregoing embodiments.

What is claimed is:

1. A shape memory shutter, comprising:
   a shape memory wire that is configured to exhibit a lower-temperature shape at a first temperature and a higher-temperature shape at a second temperature that is higher than the first temperature; and
   a shutter member, wherein the shutter member is configured to move between a first position when the shape memory wire is in the lower-temperature shape and a second position when the shape memory wire is in the higher-temperature shape, wherein the shape memory wire forms a loop through which current flows to heat the shape memory wire, and wherein the shutter member is attached to a circular portion of the loop such that the shutter member is supported by the loop.

2. The shape memory shutter defined in claim 1 wherein the shape memory wire further comprises protruding arms that extend from the loop that are coupled to a controller that controls the current that heats the shape memory wire.

3. The shape memory shutter defined in claim 1 wherein the shape memory wire comprises nitinol.

4. The shape memory shutter defined in claim 1 wherein the shutter member comprises opaque plastic coupled to the shape memory wire.

5. The shape memory shutter defined in claim 1 wherein the shutter member is coupled to the shape memory wire, the shape memory shutter further comprising a transparent colored filter structure coupled to the shape memory wire.

6. The shape memory shutter defined in claim 1 wherein the shape memory wire is configured to form a linear actuator.

7. The shape memory shutter defined in claim 6 further comprising a support structure having an opening, wherein the shape memory wire has an end that passes through the opening.

8. The shape memory shutter defined in claim 1 further comprising a spring that is configured to bias the shape memory wire.

9. The shape memory shutter defined in claim 1 wherein the shape memory wire has at least a first segment with a first diameter and a second segment with a second diameter.

10. The shape memory shutter defined in claim 1 wherein the shutter member comprises a first portion and a second portion and wherein the first and second portions are configured to form a camera aperture.

11. The shape memory shutter defined in claim 10 wherein the shutter member is operable in at least three different positions corresponding to at least three different respective aperture values for the aperture.

12. An electronic device, comprising:
   a shape memory structure;
   a component;
   control circuitry configured to apply a signal to the shape memory structure that heats the shape memory structure to transition the shape memory structure from a first shape to a second shape, wherein transitioning the shape memory structure from the first shape to the second shape adjusts light associated with the component; and
   a color filter structure, wherein the component comprises a light source, and wherein transitioning the shape memory structure from the first shape to the second shape moves the color filter structure relative to the light source.

13. The electronic device defined in claim 12 further comprising an opaque shutter member coupled to the shape memory structure.

14. The electronic device defined in claim 12 wherein the shape memory structure comprises a wire having multiple diameters.

15. The electronic device defined in claim 12 wherein the shape memory structure is configured to transition from the second shape to a third shape in response to application of an addition signal from the control circuitry.

16. Apparatus, comprising:
   a digital image sensor;
   a shutter member that is movable between a closed state that blocks light from reaching the digital image sensor and an open state that allows light to reach the digital image sensor;
   shape memory material that is configured to move the shutter member upon heating, wherein the shape memory material comprises a wire having a first portion with a first diameter and a second portion with a second diameter; and a transparent color filter structure coupled to the shape memory material.

17. The apparatus defined in claim 16 wherein the shape memory material is configured to form first and second arms that move in opposite directions upon heating.

18. The apparatus defined in claim 16 wherein the shutter member comprises an opening.

19. The apparatus defined in claim 16, wherein the first portion transitions from a lower-temperature shape to a higher-temperature shape more quickly than the second portion transitions from a lower-temperature shape to a high-temperature shape.

20. Apparatus, comprising:

a digital image sensor;

a shutter member that is movable between a closed state that blocks light from reaching the digital image sensor and an open state that allows light to reach the digital image sensor; and shape memory material that is configured to move the shutter member upon heating, wherein the shutter member forms an integral part of the shape memory material, wherein the shape memory material comprises a strip of material, wherein the shape memory material is configured to twist upon application of a signal to the shape memory material that heats the shape memory material, and wherein the shape memory material is twistable between a closed position in which the shape memory material blocks light from the digital image sensor and an open position in which light reaches the digital image sensor.

\* \* \* \* \*